US010866692B2

(12) United States Patent
Freestone et al.

(10) Patent No.: US 10,866,692 B2
(45) Date of Patent: Dec. 15, 2020

(54) METHODS AND APPARATUS FOR CREATING OVERLAYS ACCORDING TO TRENDING INFORMATION

(71) Applicant: Adobe Inc., San Jose, CA (US)

(72) Inventors: Matthew L. Freestone, West Jordan, UT (US); Mark R. Koopman, San Diego, CA (US); Frank E. Snedecor, III, Vista, CA (US); Kyung Yeo Bhattacharjee, Del Mar, CA (US); Scott T. Pead, Mapleton, UT (US)

(73) Assignee: Adobe Inc., San Jose, CA (US)

( * ) Notice: Subject to any disclaimer, the term of this patent is extended or adjusted under 35 U.S.C. 154(b) by 1179 days.

(21) Appl. No.: 13/723,385

(22) Filed: Dec. 21, 2012

(65) Prior Publication Data

US 2013/0246950 A1 Sep. 19, 2013

Related U.S. Application Data

(60) Provisional application No. 61/612,364, filed on Mar. 18, 2012.

(51) Int. Cl.
*G06F 3/0482* (2013.01)
*G06F 16/958* (2019.01)

(52) U.S. Cl.
CPC .......... *G06F 3/0482* (2013.01); *G06F 16/958* (2019.01)

(58) Field of Classification Search
CPC .......................... G06F 17/30817; G06F 3/0482
USPC ........................................................ 715/765
See application file for complete search history.

(56) References Cited

U.S. PATENT DOCUMENTS

| | | | |
|---|---|---|---|
| 8,341,540 B1 * | 12/2012 | Haynes | G06F 3/04812 715/772 |
| 8,640,037 B2 * | 1/2014 | Goodwin | G06F 17/30 715/760 |
| 8,775,611 B1 * | 7/2014 | Deshpande | G06Q 30/0201 709/224 |
| 2009/0037355 A1 * | 2/2009 | Brave et al. | 706/45 |
| 2011/0282874 A1 * | 11/2011 | Xu et al. | 707/737 |
| 2011/0320227 A1 * | 12/2011 | Thomas | G06Q 30/0625 705/5 |
| 2012/0284111 A1 * | 11/2012 | Shi | G06Q 30/0241 705/14.41 |
| 2013/0263023 A1 * | 10/2013 | Goodwin | G06F 16/958 715/760 |

* cited by examiner

*Primary Examiner* — Sherrod L Keaton
(74) *Attorney, Agent, or Firm* — Kilpatrick Townsend & Stockton LLP

(57) ABSTRACT

Methods and apparatus for providing a trending tool for presenting trending information measured or collected with regard to a content page within the context of a display of the content page. In some cases, a trending tool may be used to present trending information based on analytics data for a given selectable item of the content page, such as a clickable link or image, where the trending information may be displayed proximate to the given selectable item within the user interface. The trending information may be determined from the analytics data over a given period or periods of time. Further, the visual presentation of the trending information within, for example, an overlay may be modified based on the trending information, or based on other selected elements of the analytics data or based on other calculations of the analytics data.

16 Claims, 22 Drawing Sheets

METHODS AND APPARATUS FOR CREATING OVERLAYS ACCORDING TO TRENDING INFORMATION

This application claims benefit of priority to U.S. Provisional Application Ser. No. 61/612,364, entitled "Methods and Apparatus for Modifying Link Overlays According to Trending Information," filed Mar. 18, 2012.

BACKGROUND

The collection of analytics data such as web navigation data to analyze how users engage with content is a common practice in the field of data analytics. In this field, analysts are often faced with the task of interpreting and manipulating sets of data in order to find useful patterns or trends. Providing analysts with tools to better visualize analytics data within the context of a content page for which data analytics have been measured and collected can be extremely valuable. Various report generation tools exist to present analytics data to a user, however, the presentation of analytics data to a user in the context of the source of the analytics data collected has been limited.

SUMMARY

In one embodiment, a trending tool may include a user interface to display content pages or the trending tool may be incorporated within an analytics reporting tool to display content pages. Within a user interface the trending tool may display, for example, a content page composed of a variety of selectable items such as text or images, where analytics data for the items may be measured and collected. From the analytics data, trending information may be generated, where the trending information is with respect to one or more periods of time. Given the trending information, the trending tool may display, within the user interface and within context of the content page, a presentation of the trending information based on one or more portions of the trending information corresponding to a given item of the content page. Further, this display of trending information may be repeated for each of the selectable items. In this way, a user may see trending information corresponding to a respective link or selectable item of a content page within context of the displayed content page.

DETAILED DESCRIPTION OF EMBODIMENTS

Figure 1A:
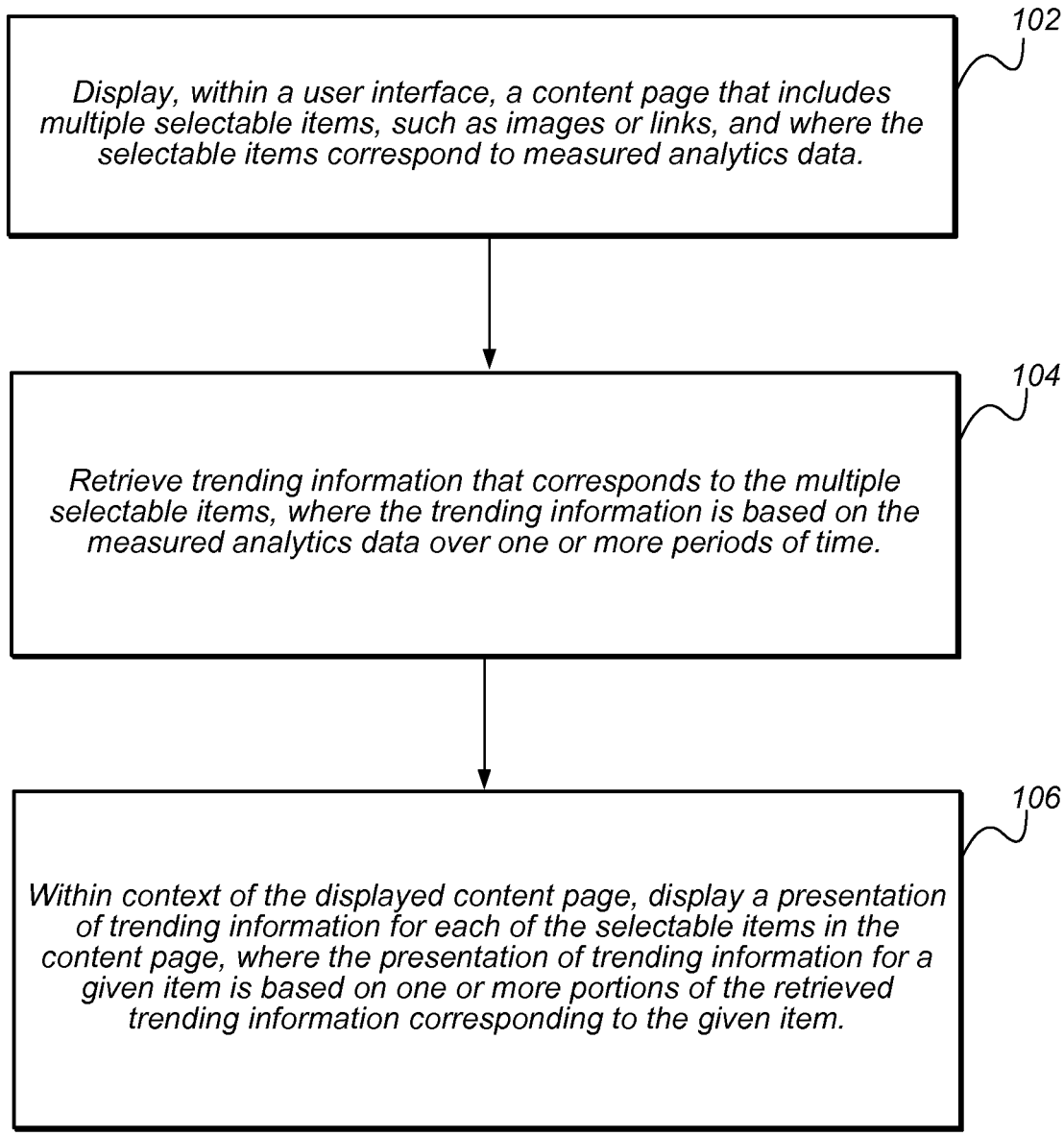
FIGS. 1A and 1B are flowcharts depicting certain processing stages of a trending tool, according to some embodiments.

Various embodiments are presented of a trending tool that allows a user to see a web page, or more generally any content page, as the web page would be seen by any person using a standard web browser—where the web page displayed within the trending tool may further display, within the context of the web page, analytics data describing trending information for the links or images within the web page.

Generally, the trending tool provides options for displaying trending information for particular links, images, or for other data analytics metrics collected with regard to a given content page. For example, in addition to providing trending information for a given link, the trending tool may provide trending information for a content page as a whole. In other words, the trending tool may provide trending information for metrics in the aggregate, where the data analytics aggregated is for all or a subset of selectable items in a content page. For example, the trending tool may provide a single presentation of trending information for a content page as a whole, where the trending information presented may be an aggregation of link clicks for all links in the page, or where the trending information may represent an aggregation of conversions or sales for some or all of the links or selectable items in a content page.

In some embodiments, the trending tool may be used to present trending information based on analytics data for a given item displayed within a user interface, where the trending information may be displayed proximate to the given item within the user interface. In displaying the trending information proximate to a corresponding selectable item in the content page, a visual association between the trending information and a corresponding selectable link may be created, which better allows a user to understand the trending information.

In other embodiments, the trending information for a given item is not displayed proximate to the given item within the user interface, and is displayed instead within a panel of the user interface that may be apart from the display of content. In this way, the context of the item as it is displayed in the user interface is maintained such that a user may simultaneously see trending information for the item along with the content, where the trending information is based on analytics data collected for the item.

In some embodiments, the functionality provided with the trending tool may be implemented within a trending component that may be installed, for example as a plugin, into another application. In some cases, the other application may be a content browser or an analytics tool such as a report building tool. In still other cases, the trending component may communicate with a given application in order to provide the trending information functionality within the application. In this description, an application so modified with a trending component is referred to as a trending tool.

In some embodiments, for example when a trending component is installed within a content browser, the content browser may be modified to allow for visualizations of trending information based on analytics data within the context of a content page. Specifically, for each link, or for a subset of links within a content page, a user may choose to display an overlay of analytics data proximate to the link as the link is displayed within the content page. Further, for a given link in the content page, the overlay information may include various aspects of the analytics data, including trending information. In some cases, the visual presentation of the overlay itself is based upon various elements of the analytics data.

Trending information may be any aspect or aspects of data defined over a given span of time or over multiple spans of time. For example, in some cases trending information may provide a user information on the popularity of a given link within a content page over a specified period of time, say the last 3 days, or the last 3 hours. Further, a user may define a particular calculation to be performed based on the analytics data that uses one or more elements of the analytics data, and this user-defined calculation may serve as the basis for which trending information is generated and presented to a user within overlays, overlay bubbles, panel bars proximate or within the context of a corresponding display page, or to a report area proximate to or within the context of the corresponding display page.

In some embodiments, the trending information may be all the information displayed within an overlay for a link, without ranking information. Further, the time granularity for the trend line, or trend graph displayed within the overlay information of an overlay corresponding to a link may be configurable to any period of time. Overlays proximate to links or elements within a content page are one method for presenting analytics data. An example overlay 802 may be seen within FIG. 8A, where overlay 802 simply includes a rank of the link with respect to the other links in the content page. However, in prior art solutions, the types of information provided within an overlay have been limited.

In one embodiment, using a trending tool, a user may select a content site for which to analyze analytics data. Given the selection of a content site and access to corresponding analytics data, a user may select to display overlay information for one or more of the links within the content page, where the links within the content page correspond to the analytics data. The trending tool may display the content page, including the links, and the trending tool may further display a visual presentation of overlay information proximate to each of the links in the content page.

In some cases, only some of the entire set of links within the content page may be selected for analysis. With the objective of analyzing the analytics data in terms of trending information, a user may input a date range over which to analyze the analytics data. In response to receiving the user input indicating a date range, the trending tool may determine, for each of the one or more links selected for displaying overlay information, respective trending information.

The trending information for each of the one or more links is based on the analytics data over the date range provided as input. Given the trending information, the trending tool may modify, for each of the one or more links, the respective visual presentation of the overlay for the given link, where the respective visual presentation of overlay information is based on the respective trending information.

In some embodiments, analytics data used by the trending tool may be accessed locally or over a network on a remote server or remote database. As noted above, in some embodiments, a trending component may be installed into a network-enabled application as a plugin, providing the network-enabled application with the functionality of the trending tool. In other embodiments, a network-enabled application may make a page request from a server, where the server may return a page embedded with the trending component, and where the trending component may be invoked and/or installed from the network-enabled application. In other embodiments, the trending component may execute remotely and may communicate with a local application, such as in a cloud computing environment—in this way, the operation of a local application provides the functionality of a trending tool.

In some embodiments, the network-enabled application may be a content browser or a content site development environment application, such as an HTML editor. In this way, a user may invoke the trending user interface element to provide visualizations of analytics data corresponding to a given content page in order for the user to modify the layout of elements of the content page to reflect popular or unpopular links, or to promote or demote links that are either increasing in popularity or decreasing in popularity.

In some embodiments, a trending tool may provide visualizations of data or visualizations of data analysis for any visually interactive interface where interactions with the interface correspond to portions of the interface such that the interactions may be tracked. For example, a gaming system developed to test the effectiveness of certain graphical elements of a game may track interactions a user may have with each of the graphical elements. Based on the tracking information, an analyst may access the tracking data and apply the trending tool to certain screen shots, or to certain video sequences, such that visualizations of the analysis of the tracking data corresponding to respective graphical elements may be overlaid onto the gaming display.

In the case of a video sequence, the visualizations, or overlays, may change to reflect trends or changes in the tracking data throughout the elapsed time corresponding to the video sequence. For example, if a graphical element of a game screen display, such as a flamethrower, was a popular selection, and in the same game screen display, a snub-nosed .38 pistol was an unpopular selection, during an analysis of the game screen display, the analysis tool may display an overlay of the game screen display indicating the popularity of the flamethrower and display an overlay of the same game screen display indicating the lack of popularity of the snub-nosed .38 pistol. In this same example, if the selection of weapons continues to be available through multiple frames of the game display, then the overlay information and the visual presentation of the overlay may change over the course of the video sequence such that the changes reflect tracking data current to the current frame in the video.

In other embodiments, a mobile phone operating system may enable tracking of user interactions with a touch screen such that interactions with installed applications or interactions with elements of the mobile phone operating system are recorded. Using the tracking data for interactions with the mobile phone operating system, the trending tool may display overlay information, where the overlay information may include trending information or any other type of display of tracking data or display of results of analysis of the tracking data overall or over selected spans of time. This overlay information may be useful to a developer in determining what elements of the mobile operating system are popular and which elements are not popular, including trending information that may be gathered across multiple upgrades to the mobile operating system.

In other embodiments, the trending component may be implemented within an analytics report tool. While a report within existing analytics report tools may allow for a user to generate multiple reports, a given report is often defined according to a particular date range specified when creating the report. It may be the case that within the generated report, a user may wish to see trending information for a given element displayed within the report across the particular date range. In such a case, the trending component may be used to provide a user with an additional lens through which the data in the report may be understood. This example is further discussed below in regard to FIG. 13.

In the following detailed description, numerous details are set forth to provide a thorough understanding of the claimed subject matter. However, it will be understood by those skilled in the art that the claimed subject matter may be practiced without these specific details. In other instances, methods, apparatus or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Embodiment: Trending Tool

FIG. 1A depicts a flowchart illustrating certain processing stages that may be present within an embodiment of a trending tool. An example user interface for a trending tool 700 is depicted within FIG. 7A. The trending tool may, for example, implement a content browser adapted to communicate with an analytics server.

For example, a user may provide credentials to a login screen of the trending tool, where the trending tool authenticates the user login credentials with an analytics server, where the trending tool may then receive analytics data corresponding to a given content page. For example, a merchant may be interested in how certain links corresponding to certain products within the merchant's home page are performing. After logging in to access the analytics data from the analytics server, or analytics servers, the trending tool may provide a user interface element for enabling the display of analytics data overlays, such as user interface element 708 of FIG. 7A.

In response to the user enabling, requesting, or initiating the display of analytics data overlays, the trending tool may then display, proximate to a given link for a product, an overlay of analytics data. The displayed overlay may include trending information, which may provide a user with a better understanding of the analytics data as compared to a simple set of analytics numbers.

For example, instead of simply displaying an overlay with information indicating that the corresponding link has been clicked 1,500 times in the past 10 days, the trending tool may display a graph within the overlay providing a visual representation of the trend of the click data. For example, if half of the 1,500 clicks have occurred in the past three days, the user may reach a different understanding of what is going on that if a clicks were evenly distributed over the past 10 days.

In some cases, the trending information may allow an analyst with the option of being able to correlate an increase or decrease in traffic corresponding to a particular link or image in a content page with a particular event or version or release of the content. For example, if a content page was updated two days ago and the trending information spans the previous seven days, an analyst may observe whether any trends in the data for a given link have occurred since the update two days ago.

In some embodiments, to begin, a trending tool may display a content page, where the content page may include multiple selectable items, and where the selectable items may each correspond to measured or collected analytics data, as reflected in stage 102. In some cases, the selectable items may be elements of a content page such as images, links, buttons, or any other possible component of the content page.

The content page displayed may be identified, for example, with a URL. The trending tool may then provide the URL to the analytics server so that the analytics server may provide the analytics data corresponding to the content page identified with the URL. In some cases, a user may simply specify a domain name, for example, through a selection of a domain name provided in a user interface panel. Further, once the initial content page is displayed, the user may navigate through to any connected content pages, for example, with a click, or some other user interface input, on a link within the content page.

Given a displayed content page that includes the multiple items, the trending tool may retrieve trending information that corresponds to the multiple selectable items, where the multiple selectable items may be some or all of the selectable items within the content page. The retrieval of the trending information is reflected in stage 104, and the trending information may be based on the analytics data for the content page over one or more periods of time.

Within context of the displayed content page, the trending tool may display a presentation of trending information for each of the selectable items in the content page, where the presentation of trending information for a given item is based on one or more portions of the retrieved trending information corresponding to the given item, as reflected in stage 106.

Figure 1B:
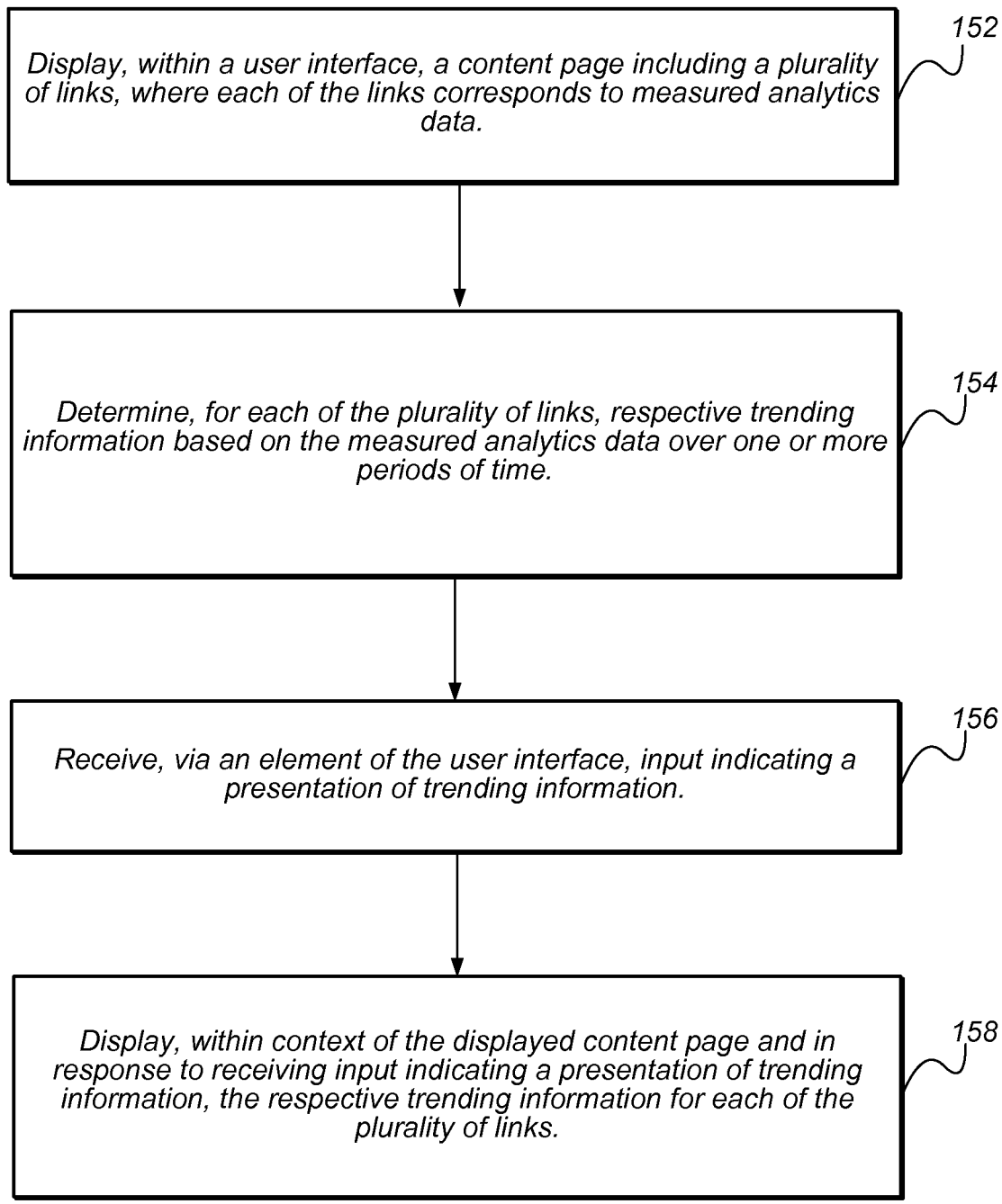

FIG. 1B depicts a flowchart illustrating certain processing stages that may be present within an embodiment of a trending tool. An example user interface for a trending tool 700 is depicted within FIG. 7A. The trending tool may, for example, implement a content browser adapted to communicate with an analytics server.

With regard to stage 152 of FIG. 1B, in some embodiments, given content, such as a content page, may be displayed within a user interface of a trending tool, where the content page includes a plurality of links, and where each of the plurality of links corresponds to measured analytics data. For example, an analytics server may track, measure, and/or collect, for each link, analytics data related to the link, and possibly aggregate of analytics data for all or some of the links in the content page or web page.

In some embodiments, the analytics data may be for elements of a content page that are not selectable, such as selectable links or images. Instead, the analytics data may be for the content page as a whole, such as time spent viewing the content page. In this case, the trending information may correspond to a time-spent-viewing metric over a given period or periods of time, and the trending information may be displayed to correspond to the page as a whole instead of any particular link or element of the content page. In such an example, the trending information may be displayed in, for example, a panel adjacent to a display of the content page, or within a portion of a toolbar, or in some other manner such that there exists a visual association between the trending information and the content page.

Further, reflected in stage 154, the trending tool may determine, for each of the plurality of links of the content page displayed within the user interface, respective trending information based on the measured analytics data over one or more periods of time. In other cases, the trending information may be pre-calculated by an analytics server, and the trending information is simply received or retrieved from the trending tool, thus allowing the trending tool to avoid performing calculations of the trending information.

The respective time periods may all be set to be the same or the respective time periods may be each tailored or adjusted individually. For example, a user may set a default value for a trending time period of 30 days, in which case the trending tool may calculate trending information accordingly. Once an overlay is displayed with the initially calculated trending information, a user may select a different time period over which the trending information is to be calculated.

In some cases, the set of the plurality of links may be all or some subset of all of the links in a content page. For example, on a content page with 200 links or images or elements corresponding to measured analytics data, the trending tool may perform the determination of trending information for only the top 100 trafficked links, images, or elements. In some cases, the trending tool may automatically determine for which links/images/elements to display trending information based on limitations of the display with regard to possibly overcrowding the user interface with too much information and based on a ranking of the link/image/element.

In other cases, the trending tool may select a subset of the links, images, or elements on a page based on a category of analytics data or a category of the link, image, or element. For example, trending information may be only be determined for links, images, or elements leading to a sale or sales over a certain amount or to some other aspect or metric of the analytics data. In other cases, the trending information may be determined for links, images, or elements for the top 20, or top 10, or top user-defined amount of most drastic changes in trending information.

Given a determination of trending information for the plurality of items within the content page, the trending tool may then provide or display the trending information in response to user input requesting that trending information be displayed. For example, a user may provide input such as clicking on a "Trended" button 710 within the trending tool user interface 700 depicted in FIG. 7A. As depicted at stage 156, the trending tool may receive the input indicating a presentation of trending information, for example from the selection of the Trended button 710. In some cases, a response to the receipt of the input may be generating trending information for each of the plurality of items. In other cases, the trending information may have been calculated prior to the display of the content.

In some embodiments, a user may right-click over a specific link within the content page and select from a menu of options an option to enable trending information for the specific link. In other embodiment, different types of input may be provided, for example through the visual recognition of a gesture or through some other means.

In response to receiving the input, the trending tool may display, within context of the content page displayed in the user interface, the respective trending information for each of the plurality of links, as reflected in stage 158.

Figure 8A:
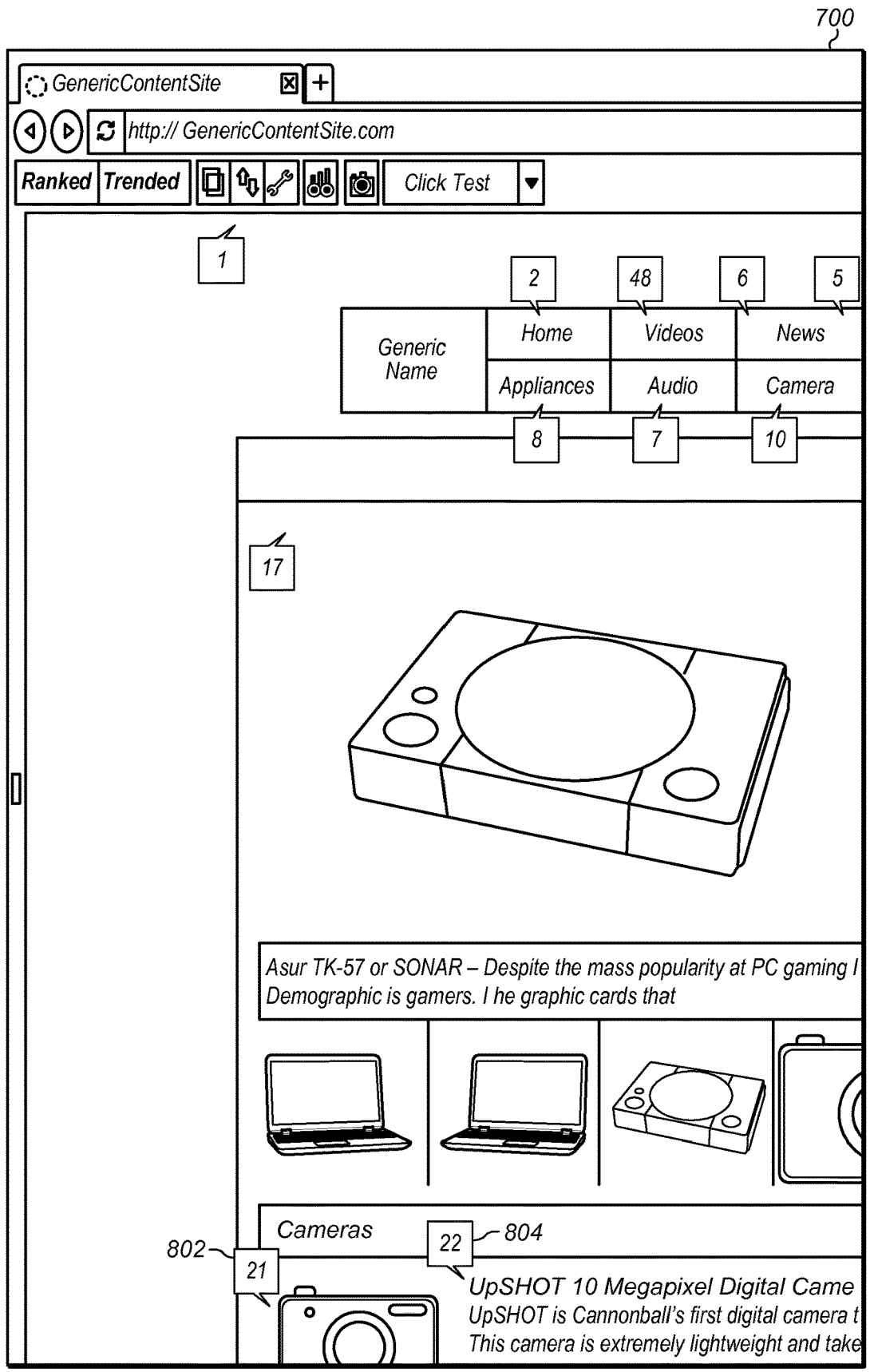
FIGS. 8A and 8B depict an illustration of overlay bubbles and a trend information graph, according to some embodiments.
Figure 8B:
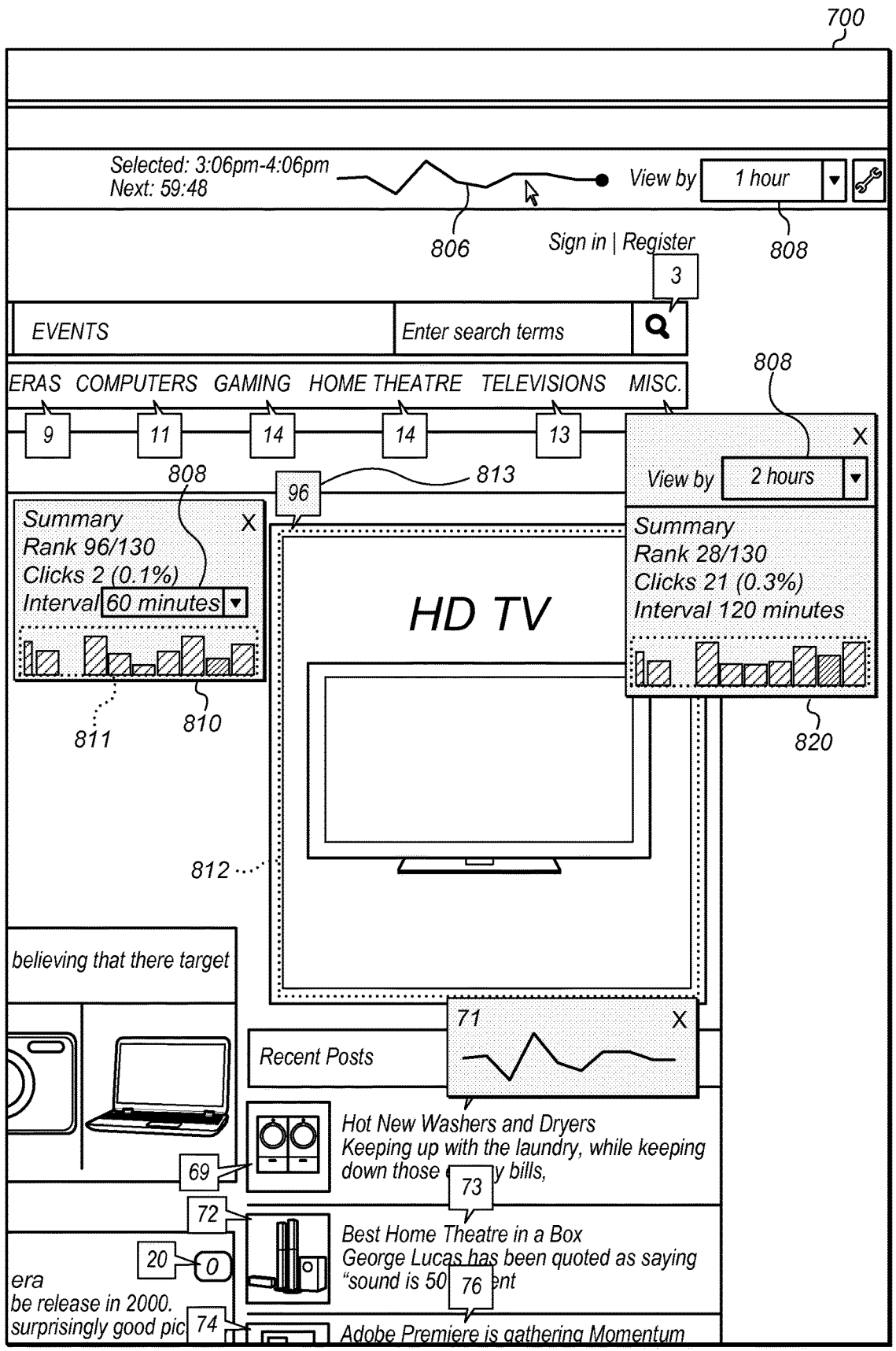

This trending information may be displayed, for example, within an overlay proximate to a respective link, image, or element of the content page, as illustrated within elements 810 and 811 of FIG. 8B. In FIG. 8B, overlay window 810 may appear as a popup alongside, or in some cases within, overlay bubble 813, which corresponds to image 812, and where image 812 corresponds to a segment of analytics data serving as the basis for the trending information and the analytics data within overlay bubble 813 and overlay 810.

In some embodiments, instead of displaying the trending information in response to user input from a user interface element, the trending tool may instead receive a request from another application to display the content page with the trending information. For example, a third party application, through an application programming interface implemented within the trending tool, may request an image of a content page to be returned such that the image includes the trending information as it would be visible, for example in FIG. 8B or 10A.

Figure 2:
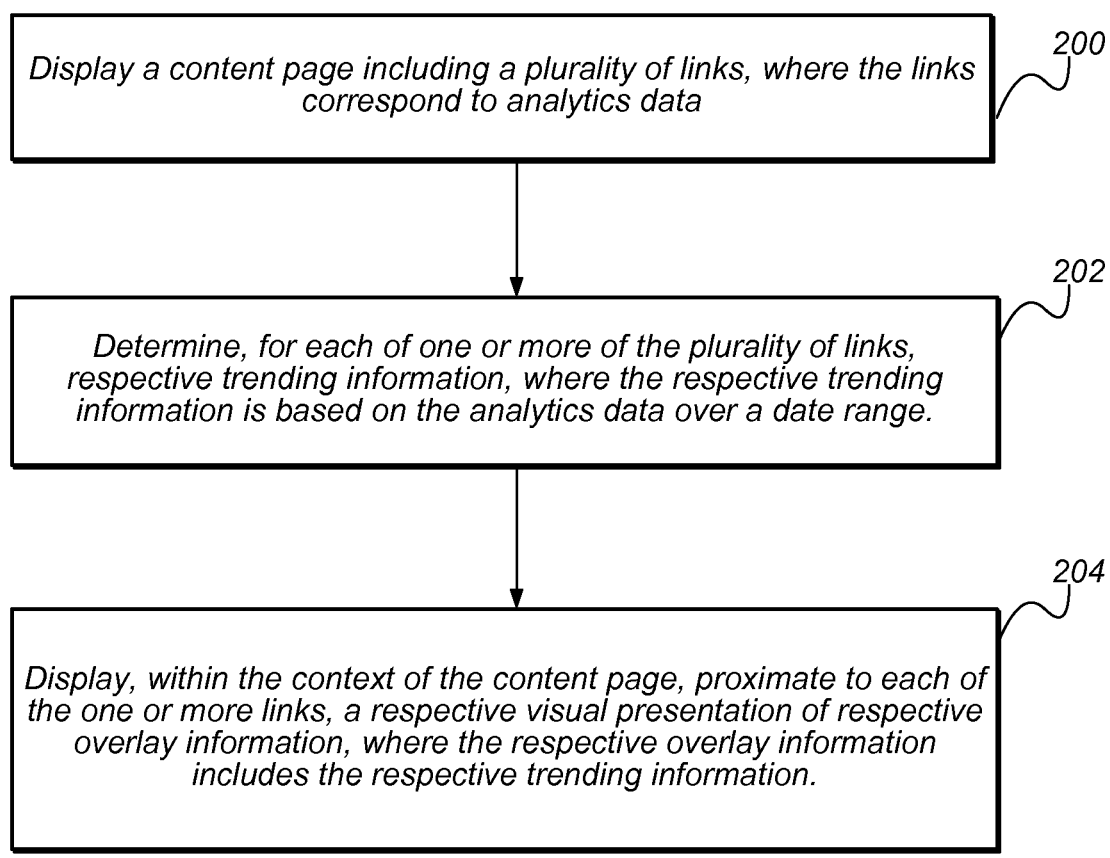
FIG. 2 is a flowchart depicting certain processing stages of a trending tool, according to some embodiments.

FIG. 2 illustrates an embodiment of a trending component as the trending component would be incorporated into a content browser. As discussed above, a trending component, as implemented within the content browser, may enable the content browser to display trending information for a content page for a content site, where the content page includes multiple links, and where the links correspond to analytics data, as reflected in stage 200. In this example, the modified content browser is referred to as a trending tool.

The trending tool may, for each of one or more of the total number of links in a content page, determine respective trending information based on the analytics data over a date range, as reflected in stage 202. For example, for a given link within the content page, the trending tool may communicate with an analytics data server to query the analytics data server for trending information based on parameters identifying the link, the content page, and the date range, among other possible parameters.

Given a determination of respective trending information for each of the one or more links in the content page, the trending tool may display a respective visual presentation of respective overlay information for the one or more links. Further, the respective visual information for the respective overlay information may be displayed proximate to its corresponding link and may include the respective trending information, as reflected in stage 204.

Figure 3:
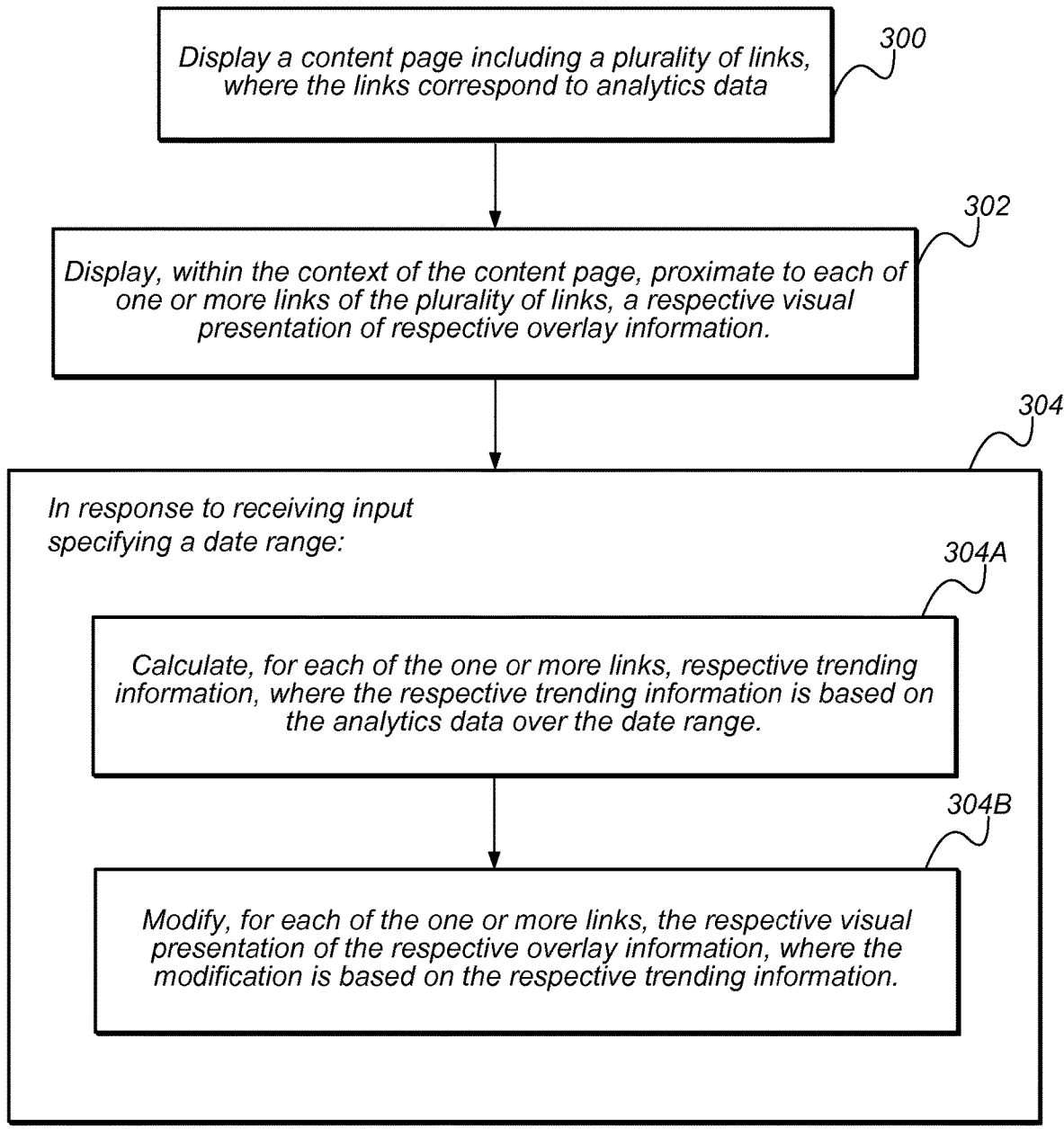
FIG. 3 is a flowchart depicting certain processing stages of a trending tool, according to some embodiments.

FIG. 3 illustrates certain processing stages of an embodiment of a trending tool. The trending tool may display a content page for a content site, where the content page includes multiple links, and where the links correspond to analytics data, as reflected in stage 300.

The trending tool may display an overlay proximate to each link in the content page within the context of the content page, as reflected in stage 302. In some cases, only a subset of the links are selected for displaying overlays and overlay information, as noted above.

Further, in some embodiments, an overlay may be displayed as a semi-transparent box surrounding or next to a given link. However, the overlay may be displayed in a variety of ways such that the overlay information within the overlay is visually distinct from the content page and where the overlay is displayed proximate to the given link.

More generally, the trending tool may display the overlay such that there is a visual correspondence to indicate to a user that a given overlay corresponds to a given item, link, or element of the displayed content. For example, an icon displayed proximate to a link may be displayed such that the icon tapers to a point that points to the corresponding link. Further, in this example, when a user clicks on the icon or hovers over the icon, a callout window may be displayed with greater amounts of analytics information, as depicted within callout window 810 and icon 813 within FIG. 8B.

In some embodiments, overlay information, which may be based on the analytics data may include any single determined measure, or any combination of aspects of the analytics data or any combination of raw analytics data and generated values based on the analytics data. For example, the overlay information may include a ranking for the link with respect to other links, as depicted in callout window 810 of FIG. 8B, where the rank of the corresponding link is 96 out of 130. In other cases, the ranking may be based on a formula such as a weighted average of clicks and a number of conversions, or some other user-defined formula for combining metric values of a set of analytics data.

In other examples, the overlay information may include a geographic region corresponding to the greatest number of selections for the link, or the overlay information may include trending information for the link over a date range. In the case that trending information is part of the overlay information, the trending information may be based on a default date range, where the default data range is determined prior to the display of overlays. In other cases, the trending information may be generated in response to a user selection of a date range and an the receipt of an indication to include the trending information in the overlay.

In some embodiments, instead of, or in addition to, displaying trending information within an overlay, the trending tool may display trending information in other parts of the user interface while maintaining the context of the displayed content page. For example, the trending information may be for the entire content page and may be displayed in a panel bar above, below, or next to the displayed content page, as depicted with mouse 912 hovering over an image link and a corresponding trending graph 914 within FIG. 9B. In this example, the panel bar with the trending information may display a graph over a date range corresponding the trending information of the content page as a whole, or the trending information may be for a select group of links within the content page. Further in this example, the panel bar trending graph may change to correspond to analytics data for a current link being hovered over.

In other cases, the trending information displayed in the panel bar may correspond to a currently selected link, or based on a selection of a link due to a mouse hover over the link. For example, if a user hovers a cursor over a given link in the content page, the panel bar display may display the trending information for the given link, and in response to the user hovering over another link, the panel bar may be updated to reflect trending information for the other link.

In other cases, the panel bar may show trending data for each of the links in the content page, or for a subset of the links in the content page, for example, with the display of multiple trending graphs corresponding to the links or subset of links. Such an example is depicted within panel 1002 of FIG. 10B.

In response to input indicating a date range, the trending tool may determine new trending information based on the specified date range and modify the display of the overlays according to the new trending information, as reflected in stage 304, and within the sub stages 304A and 304B.

In this case, in response to receiving input specifying the date range, the trending tool may determine or calculate respective trending information for each of one or more of the links in the content page, where the respective trending information is based on the analytics data over the specified date range, as reflected in stage 304A.

Further in response to receiving input specifying a new date range, the trending tool may modify the respective visual presentation of the respective overlay information for the respective overlay for each of the one or more links in the content page, where the modification is based on the respective trending information, as reflected in stage 304B.

In other cases, for example where a trending component is implemented independently of a content browser, the trending component may communicate information and/or commands to the content browser in order to effect a similar change—in some cases over an application programming interface (API). For example, this communication may occur over an API 414 implanted within the trending component 412 that communicates through a direct coupling 420 or over a network 402 with an API 418 within content browser 416, as depicted within FIG. 4.

A similar communication arrangement may be implemented for the trending component 412 using API 414 to communicate with a reporting tool 422 using API 424 over communication link 420. In some cases, the reporting tool may generate and display analytics reports such as the report 1302 depicted within FIG. 13.

In some embodiments, a modification to the visual presentation of an overlay displaying overlay information may take several forms. For example, if the given link is trending positively then the visual presentation of the overlay may be modified to be green. In other example, a positive trend may be reflected with other types of visual indications, such as through the modification of the shape of the overlay from a rectangle to an octagon, or with different color text for the overlay information, or through displaying the background of the overlay in a distinctive pattern.

Example Computing Environment

Figure 4:
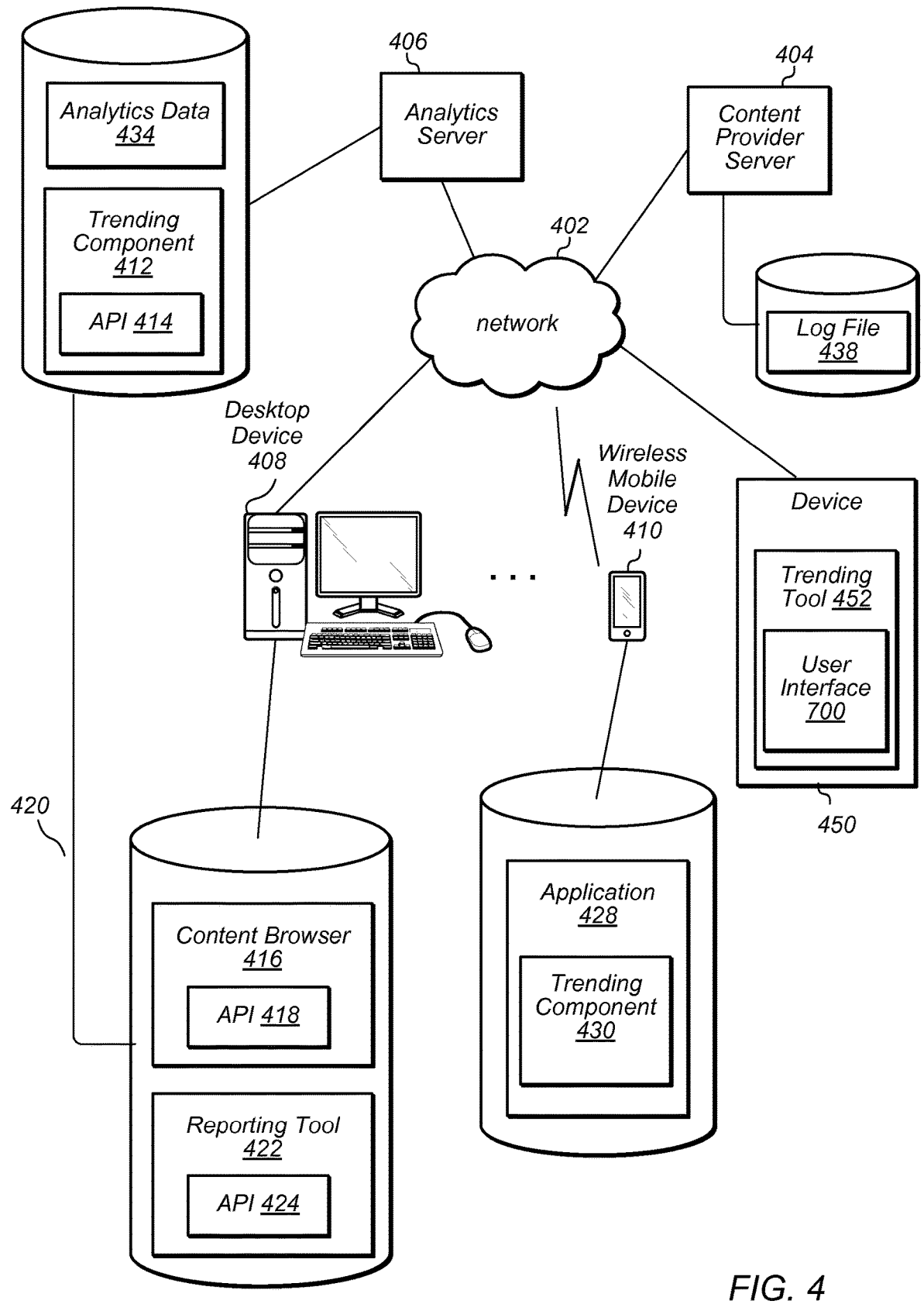
FIG. 4 depicts an illustration of a network environment in which data may be collected and in which a trending tool may be implemented, according to some embodiments.

FIG. 4 depicts an illustration, according to one embodiment, of a computing environment in which a trending tool or trending component may operate. In the embodiments described herein, the type of data is not relevant to the operation and functionality of the trending tool. In other words, any set of data may serve as the basis for generating visualizations of trending information.

In regard to some of the embodiments described above in regard to FIGS. 1, 2, and 3, a device 450 may serve as the platform upon which trending tool 452 executes. In such an embodiment, trending tool 452 may communicate over network 402 with analytics server 406 to retrieve analytics data with which to display overlay information and trending information within a user interface 700 of trending tool 452.

In the case of processing analytics data, a user of a report building tool 422 may have access to the remotely or locally stored analytics data 434 for a given content site. For example, the user may, using a report building tool, log in to an analytics server 406 corresponding to the content site. A user may then interact with a generated report to display trending information as described below in regard to FIG. 13. In some cases, a reporting tool 422 may execute on a desktop device 408, where the reporting tool 422 communicates using API 424 with analytics server 406 over communication link 420 with API 414 of trending component 412 executing on analytics server 406.

Other methods for accessing the analytics information are possible, and so long as analytics data can be accessed, the disclosed embodiments may operate successfully. In some cases, a trending component 430 may be implemented on an application 428 installed on a mobile device, such as mobile device 410, where application 428 as enhanced according to trending component 430, may implement the various embodiments of handling trending information described herein.

Collection of analytics data may be performed in a variety of ways, and the disclosed embodiments of a trending tool do not depend on any particular method for the collection of analytics data. In some cases, log files, such as log file 438, may be created on a content provider server to record every transaction made between a device consuming content and the server providing the content, such as between a user operating desktop device 408 and Content Provider Server 404 in FIG. 4, or between a user operating mobile device 410 and Content Provider Server 404. The log files created may be periodically or aperiodically transmitted to an analytics server, such as Analytics Server 406 to be stored as analytics data 434, as depicted within FIG. 4.

Another approach that may be used is page tagging or web bugs, where the request for a content page may result in a content page that, upon being displayed by a user's internet-enabled application, may initiate tracking of the user's navigation habits and provide the tracking information to an analytics server. In some cases, an image request indicated within a requested page serves as the catalyst for the execution of a script used to collect the analytics data. The analytics data is reported along with the image request made to the analytics server. The actual requested image may be invisible to the user, such as a transparent 1×1 pixel, displayed within the content page.

Some types of analytics data collected may be hits, or a request for a file from a web server, page views, visits, sessions, unique visits, unique visitors, repeat visitors, new visitors, impressions (of advertisements or other content), singletons (visits where only a single page is viewed), bounce rate (percentage of singleton visits), exit percentage, visibility time, session duration, page view duration, engagement time (amount of time a visitor is on a page), page views per session, click paths, clicks, browser type, display size, display resolution, among other metrics.

In general, any collected metric, or quantitatively measurable aspect of the analytics data, may be used in generating trending information over a given time period or over a given series of dates. For example, a time period may be a contiguous set of dates, such as Oct. 1, 2012 through Oct. 28, 2012. In other cases, a time period may be any collection of dates or time periods, for example, the first Sunday of the past three months, or every Monday morning, from 8:00 AM EST until 12:00 PM EST, for the past 17 weeks.

Example Cloud Computing Environment

Figure 5:
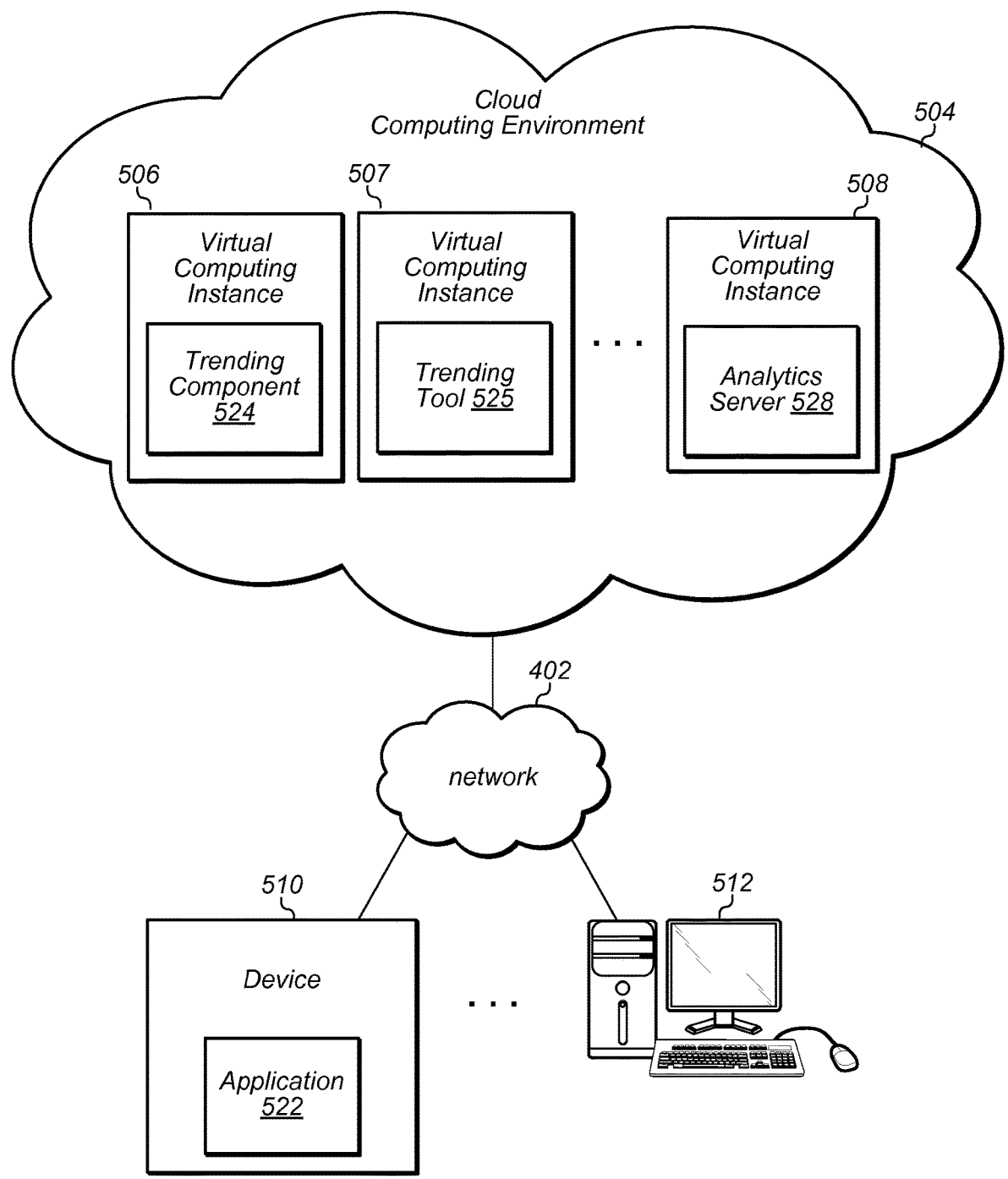
FIG. 5 depicts an illustration of a cloud computing environment in which the trending tool may be implemented, according to some embodiments.

FIG. 5 depicts one possible computing environment that includes a device 510 accessing a cloud computing environment 504 over network 402. In this example, an installed application 522 on a device 510 may be used to access any of the above-discussed embodiments of a trending tool or component executing within one of the virtual computing instances 506 through 508.

Further, in some embodiments, different combinations of the above-discussed computational elements of a trending tool may be implemented locally on device 510 and remotely within one of the virtual computing instances 506 through 508. For example, virtual computing instance 506 may implement trending component 524 to provide services to application 522 executing on device 510. In another example, virtual computing instance 507 may implement a trending tool 525 that may be remotely accessible to a user operating device 510 or device 512.

In other embodiments, the trending component may be implemented on a computer 512 accessing cloud computing environment 504 over network 402. In this example, a user may log in to cloud computing environment 504 to access a virtual computing instance 508 within which an embodiment of an analytics server 528 is executing or may be executed.

Further, in some embodiments, different combinations of the above-discussed computational elements of a trending tool may be implemented locally on computer 512 and remotely within one of the virtual computing instances 506 through 508.

Example Trending Tool User Interface

Figure 7A:
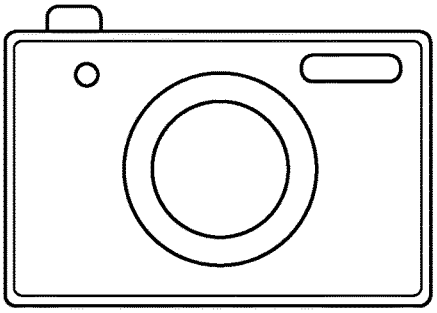
FIGS. 7A and 7B depict an illustration of user interface elements for invoking a trending tool, according to some embodiments.
Figure 7B:
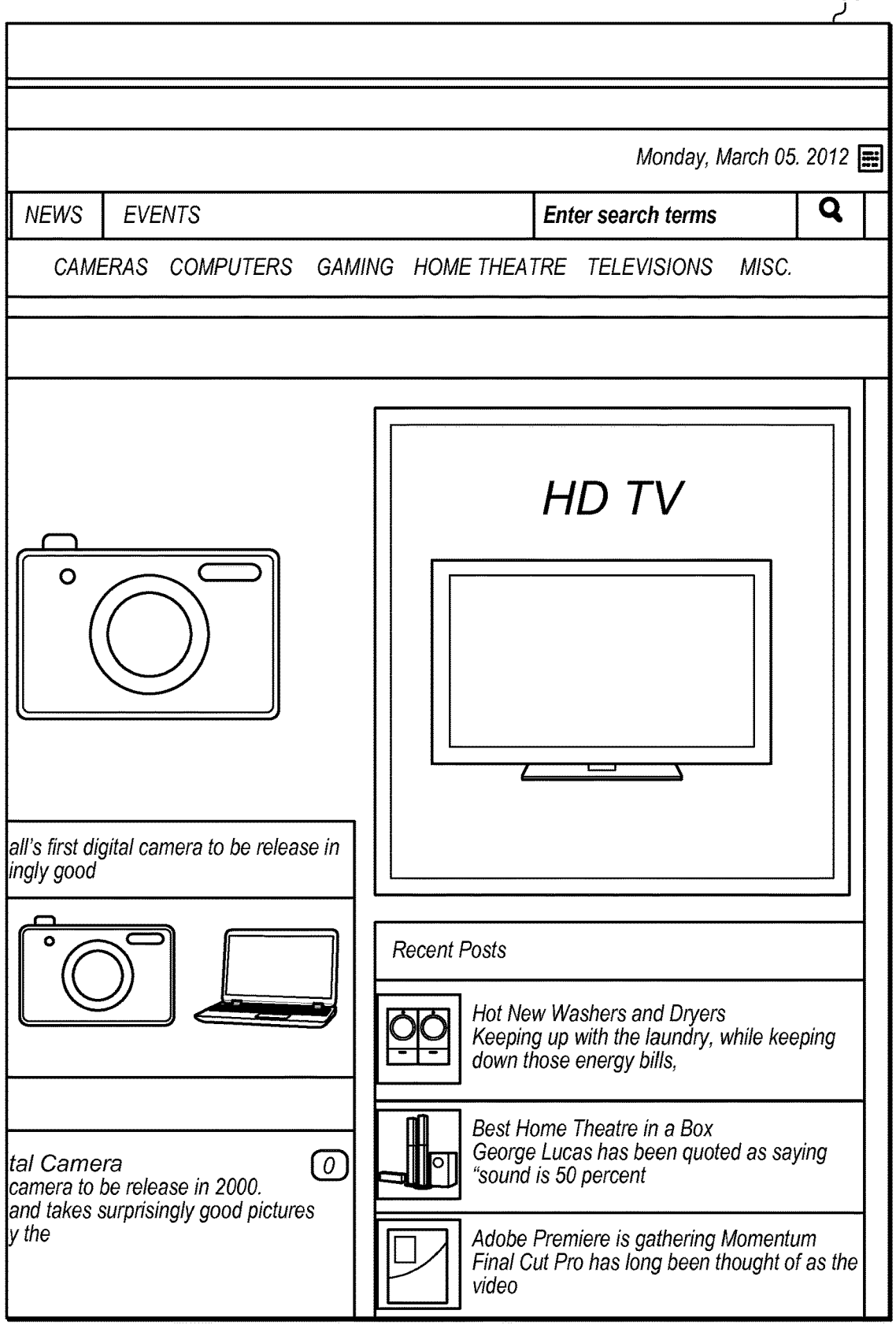

FIGS. 7A and 7B each depict a half of a display screen, or trending tool user interface, 700, where FIG. 7A corresponds to the left half and FIG. 7B corresponds to the right half. In this example, a user has selected to analyze analytics data for a content site GenericContentSite and for a content page of GenericContentPage.com, as indicated by element 712. The content page of GenericContentSite.com is displayed as it would be displayed to a web user navigating to the site using any standard browser application, and where panel 701 is analytics data provided from the trending tool and is not part of the content page.

In some embodiments, when initially invoked, the trending tool may display a column of analytics data within panel 701 corresponding to the content page within the context of the content page display, in this case, the analytics data is displayed in a column panel adjacent to the content page display.

Within the column panel may be displayed a Page Report 702 and Page Flow 704. Within Page Report 702 may be displayed a default set of elements of analytics data, including Total Page Views 706, and, among other, entry count, exit count, single page visits, average clicks to page, average time spent on the page, number of reloads, and the bounce rate. Within Page Flow 704 may be displayed a default set of analytics data elements related to how a user reached the given content page, and among the analytics data elements are percentage of previous pages, external referrers such as various search engines, and page exits.

The analytics information displayed in the column panel may be displayed corresponding to a user interface setting of "Ranked", as indicated by user interface element 708. Displayed next to the Ranked 708 button is a Trended 710 button, and when a user selects the Trended 710 button, the display of the content page may be updated to display overlays corresponding to overlay information that includes trending information.

FIGS. 8A and 8B each depict the same user interface window 700 as described above in regard to FIGS. 7A and 7B. However, in FIGS. 8A and 8B, the display of the content page has been updated to reflect the user selection of the Trended 710 button. In this example, the column panel displayed the ranked analytics data is no longer displayed in response to the user selecting the Trended 710 button. However, in other cases, the panel 701 may continue to be displayed.

In the trended mode of the trending tool, the content page display is modified such that overlay bubbles are displayed proximate to each link in the content page. As noted above, in some cases, only a subset of links may be selected for displaying overlay information and/or trending information.

For example, overlay bubble 802 corresponds to the image link of a camera, where the overlay bubble includes a number display of 21, and where the number displayed in the overlay bubble indicates a ranking over a period of time. In some cases, the period of time is a default value defined prior to the user entering the trended mode upon selecting the Trended 710 button, in this example, 10 hours. The window of time is used as a filter of the analytics data in order to generate ranking data corresponding only to the selected window of time. Overlay bubble 804 corresponds to the linkable text of "UpSHOT 10 Megapixel Digital Camera" and over the last 10 hours, and in this case, the link ranks $22^{nd}$ among the links over the last 10 hours.

In some embodiments, the number displayed within the overlay bubble may correspond to some other aspect of the analytics data, such as a correspondence to conversions, or to any other user selected aspect of the analytics data. The number displayed within the overlay bubble may correspond to any user defined configuration setting defined prior to entering the trended mode, or the user may modify the number to display while in the trended mode.

In some cases, the user may define not simply an extracted value or aspect of the analytics data, but the user may defined some customized calculation to be performed based on multiple aspects of the analytics data, such as a value based on the ranking as weighted according to conversions, or a ranking multiplied by a factor corresponding to a given search engine.

For example, if a user wanted to see rankings based only where the referrer is Google, the user may define the overlay value to be: "if (referrer=="Google") {overlay_value=ranking} else {overlay_value=0}". In other words, a user may define any rule or value to be generated to correspond to an overlay bubble value.

In other cases, a user may choose to display text or a string value, where the string value is defined according to a user-defined rule, such as, "if the ranking is in the top third, the overlay_value='HOT'; if the ranking is in the middle third, the overlay_value='TEPID'; if the ranking is in the bottom third, the overlay_value='COLD'".

Similarly, a user may choose to display text depending on trending information, such as, "if the number of clicks has increase more than 20% in the past ten days, overlay_value='RISING'; if the number of clicks has not increased more than 20% or decreased more than 20%, overlay_value='STABLE'; if the number of clicks has decreased more than 20%, overlay_value='SINKING'".

Further, in addition to the result to display within an overlay bubble, the user may also use a rule that defines the result to include modifications to the visual presentation of the overlay bubble. For example, in the previous example for displaying text, the user may specify that in addition to displaying "HOT", the overlay bubble should be displayed in the color red, and in addition to displaying "TEPID", the overlay bubble should be displayed in pink, and in addition to displaying "COLD", the overlay bubble should be displayed in blue. In addition to color, the user may select to modify any visual element of the visual presentation of the overlay bubble.

Further, the user may choose to display more than a single value or result within the overlay bubble, or a combination of an analytics data element, a computation based on the analytics data, or a text string. For example, a user may choose to display both a ranking value and also to display text based on a rule, such as the rule described above to display "HOT", "TEPID", and "COLD".

Further, upon entering the trended mode of the trending tool, a user may see a graph or trend line, as indicated by element 806. In some embodiments, the graph reflect any aspect of the analytics data over a given period of time. For example, element 808 reflects that the graph is based on analytics data over the last one hour. The window of time may be modified upon activating the pull down menu to select another window of time, or the user may enter any specific window of time, such as the window of time between 8:06 PM and 11:01 PM on Mar. 18, 2012. In other cases, the window of time may default to a rolling date, such as the past 10 hours, or the past week, or the past month. Time period selection element 808 may also be incorporated within a user interface for an overlay, such as overlay 820, where within the overlay, a user may adjust the time period. In some cases, the overlay may include only the trending information, such as overlay 822.

In some embodiments, graph 806 may be the only trending information presented for the entire content page, in which case graph 806 may be an aggregate representation of trending information for the content page as a whole, for a subset of the selectable items within the content page, for all selectable items of the content page, or a combination of these measures of trending information. For example, graph 806 may represent trending information for the number of views of the content page, or for some other measured metric of the content page. In other cases, graph 806 may be the aggregated trending information for the top 20, or top user-configurable number of selectable items.

In some embodiments, the graph may be based on the same aspect of the analytics data which the value in the overlay bubble is based. For example, if the overlay bubble is defined to correspond to the number of clicks for a corresponding link, then the graph 806 in the panel bar may graph the number of clicks for all links in the content page. In some cases, a user may select a given overlay bubble or a given link, and upon selection, the graph 806 may be updated to reflect only the value in the bubble over the specified window of time. In some cases, the user may select a group of links fewer than all links in the content page, for example, selecting a first link which result in the graph being updated, and then holding down the SHIFT key to select a second link, or overlay bubble, and in response the graph may be updated to reflect the two selected links. The user may continue this process until every link in the content page is selected.

In some embodiments, the overlay bubble is responsive to user input to display an even greater quantity of information. For example, if a user hovers a cursor over an overlay bubble, the overlay bubble may expand to display multiple aspects of the analytics data corresponding to the link with which the overlay bubble corresponds. In some cases, the expanded overlay may include a graph similar to the graph 806 reflective of trending information for the corresponding link. The graph within the expanded overlay information may be manipulated similar to the graph 806, for example, a user may drag a time selection point in the graph to change the time period focus on which the overlay information is based, and the overlay information may then be synchronized to the currently selected point in time.

Further in response to a user modifying the time period focus of the overlay information, the bubble display value may change to correspond to the currently selected time period focus. In this way, a user may see a visualization of the analytics data, including trending information, across an arbitrary span of time such that the analytics data is focused on the currently selected link and link overlay. As an example, expanded overlay 810 includes a summary of analytics data corresponding to image link 812, where the expanded overlay 810 is displayed in response to a user hovering over the overlay bubble 813 corresponding to image link 812. The summary information may include any number of aspects of the analytics data, including ranking information, click counts, and an interval of time over which the trend graph 811 within the overlay is defined. Trend graph 811 may be defined to be any type of graph, such as a line graph, or as displayed, a series of columns.

Figure 9A:
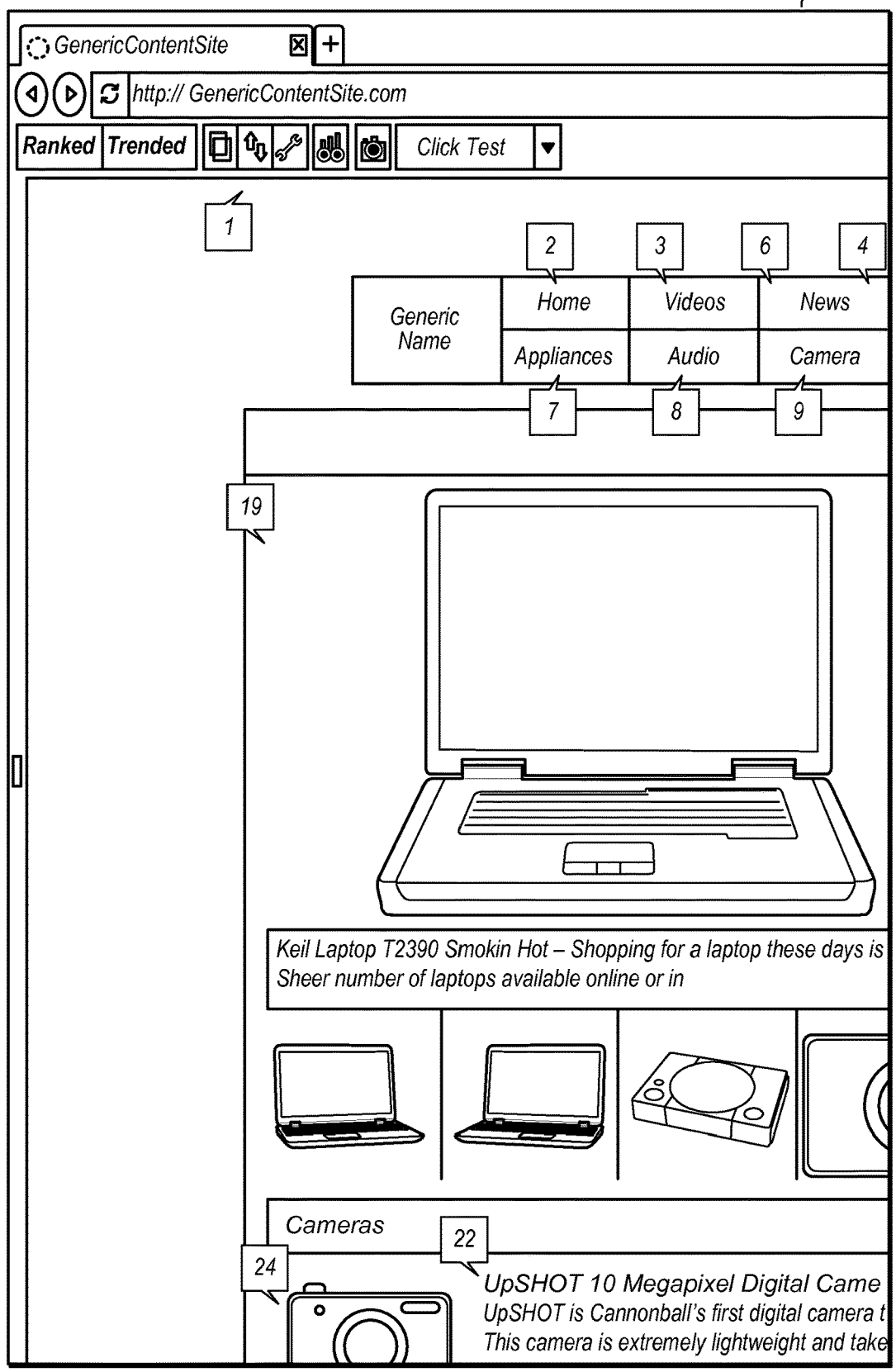
FIGS. 9A and 9B depict an illustration of changing a time range corresponding to the overlay information, according to some embodiments.
Figure 9B:
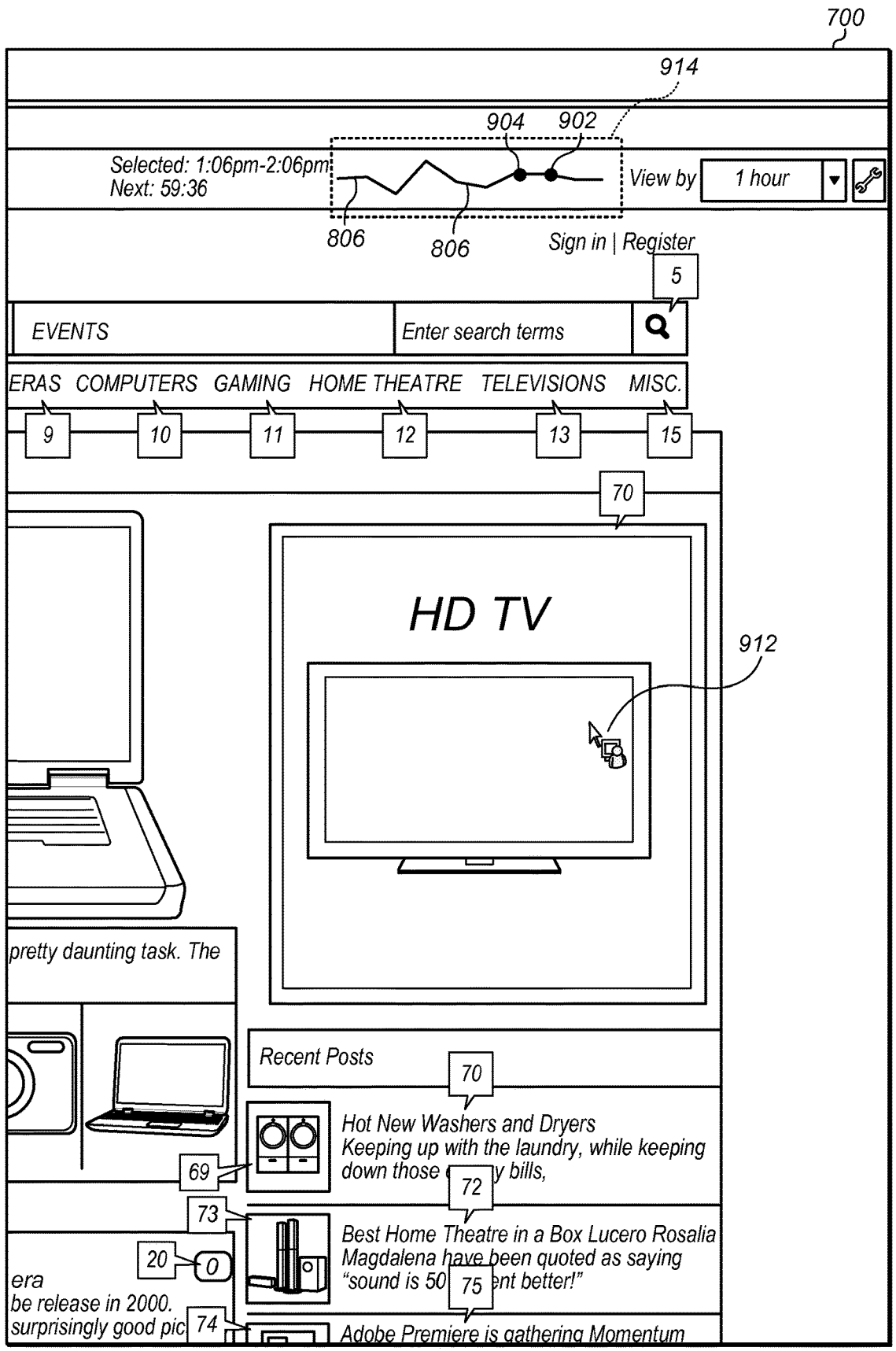

FIGS. 9A and 9B depict the same state of the trending tool user interface upon entering the trended mode. However, FIG. 9B further depicts a user dragging a point along the graph, where in response, the overlay values in the overlay bubbles are updated to reflect the point in time within the graph window of time currently selected.

For example, upon first entering the trended mode, the graph may correspond to a window of time of the last 10 hours, and the overlay values in the overlay bubbles may correspond to the tail end of the graph, or the most recent moment of time. Element 902 corresponds to an arbitrary point of time within the window of time for the graph, and the values in the overlay bubbles correspond to the point in time indicated by element 902. When the user drags the dot indicated by element 902 to the position indicated by element 904, a new point of time within the window is used as the basis for generating the values in the overlay bubbles. In this way, with a simple drag of a dot across a graph, a user may visualize the analytics data as the overlay information is updated to correspond to the currently selected point in time along the graph.

Figure 10A:
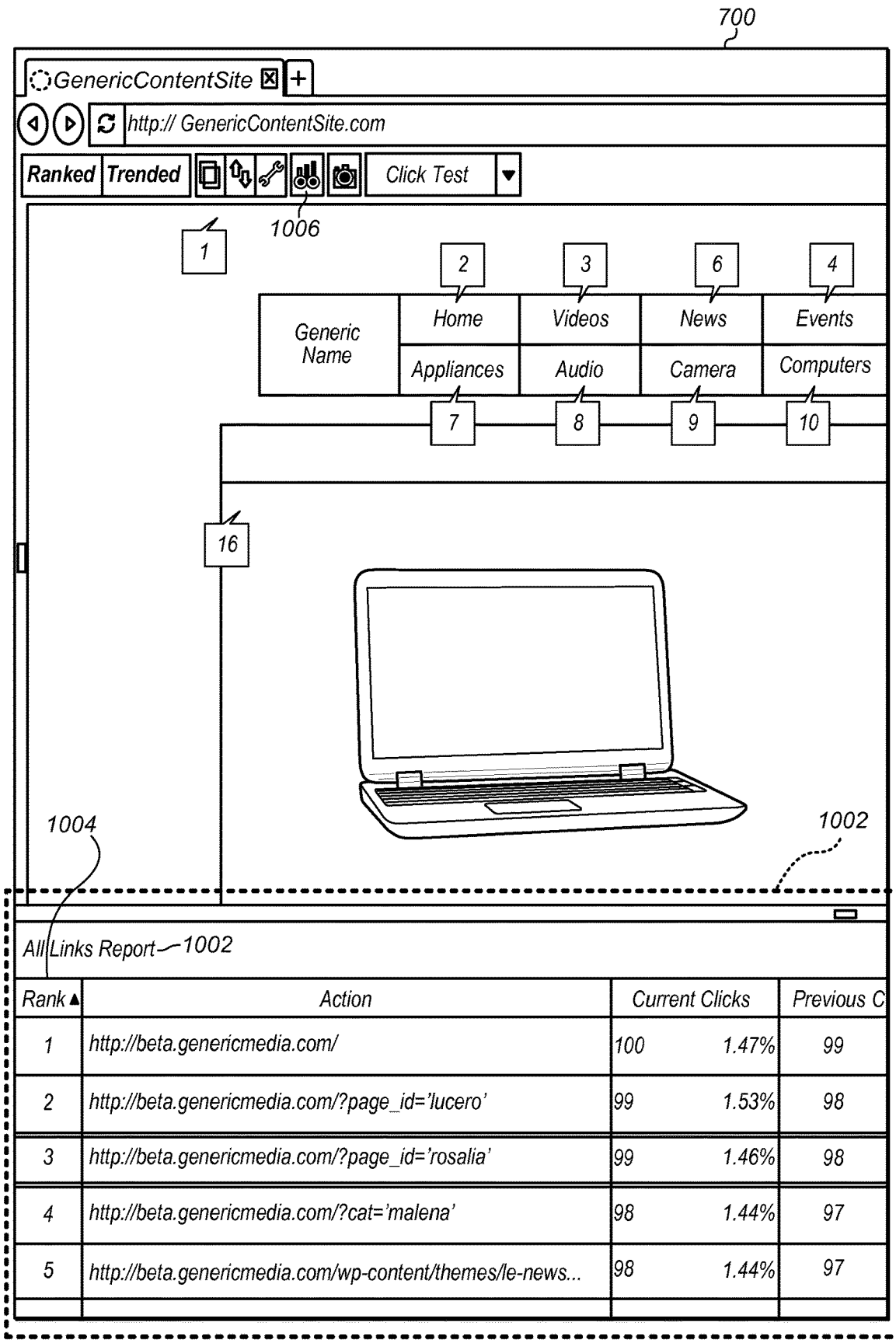
FIGS. 10A and 10B depict an illustration of trending information graphs for multiple links in a content page, according to some embodiments.
Figure 10B:
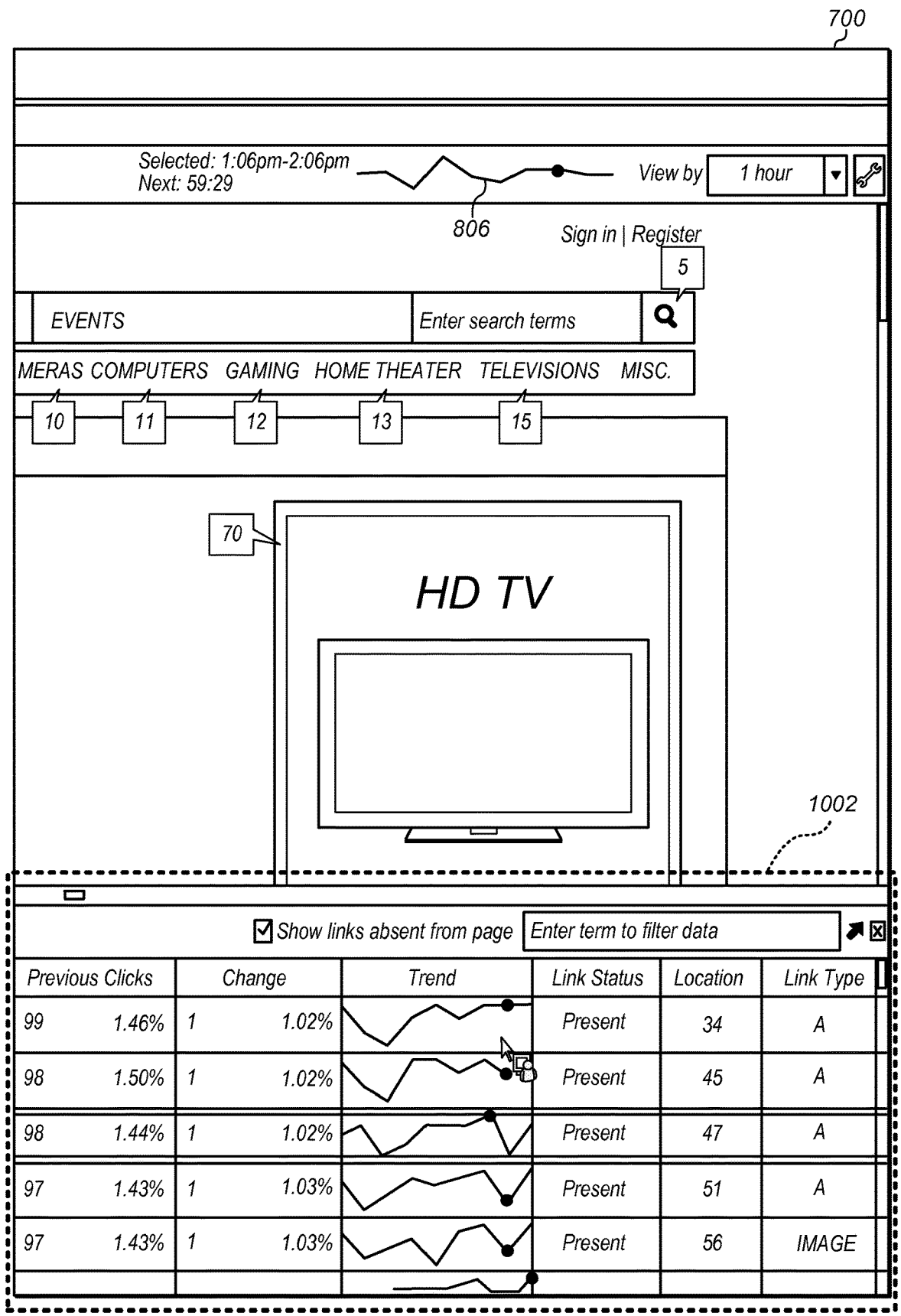

FIGS. 10A and 10B depicts alternative visual presentations of the analytics data displayed within the context of the display of the content page. In this case, a report of the analytics data corresponding to the content page and also over the period of time corresponding to the graph 806. The report 1002 may include a default configuration, however, the report content may be defined according to any user configuration. In this example, the report contents are sorted according to a ranking value, as depicted in column 1004, and each report row includes an action, current clicks, previous clicks, change percentage, a trend graph, link status, location, and a link type. In this report, the "Link Status" column 1006 indicates whether or not a given link is presently within the displayed content page, which given that an arbitrary point of time may be selected for a display of the content page and corresponding analytics data, if the content page has changed, the change may include adding or removing links.

Figure 11A:
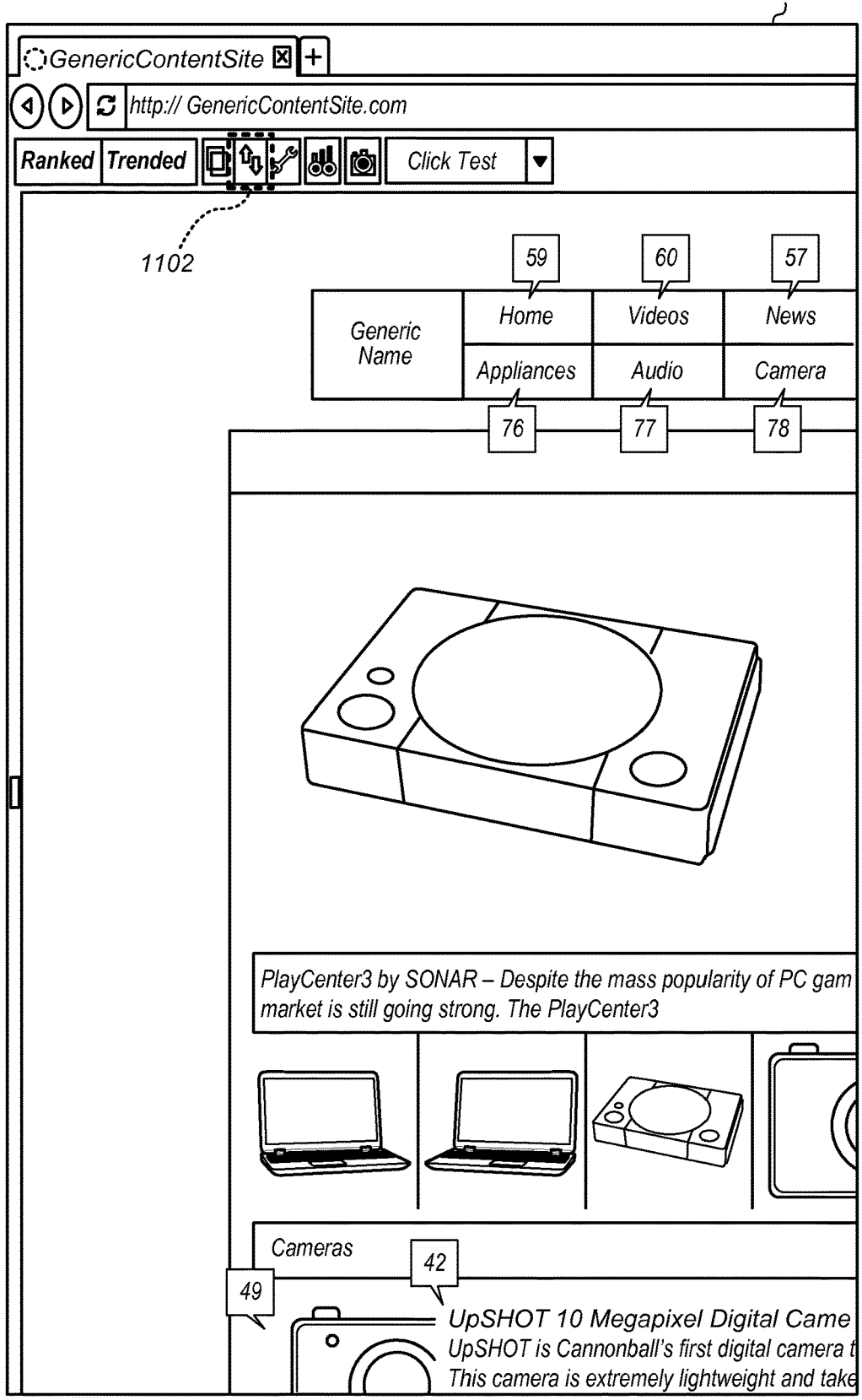
FIGS. 11A and 11B depict an illustration of overlays reflecting visual presentation modifications corresponding to gainers and losers, according to some embodiments.
Figure 11B:
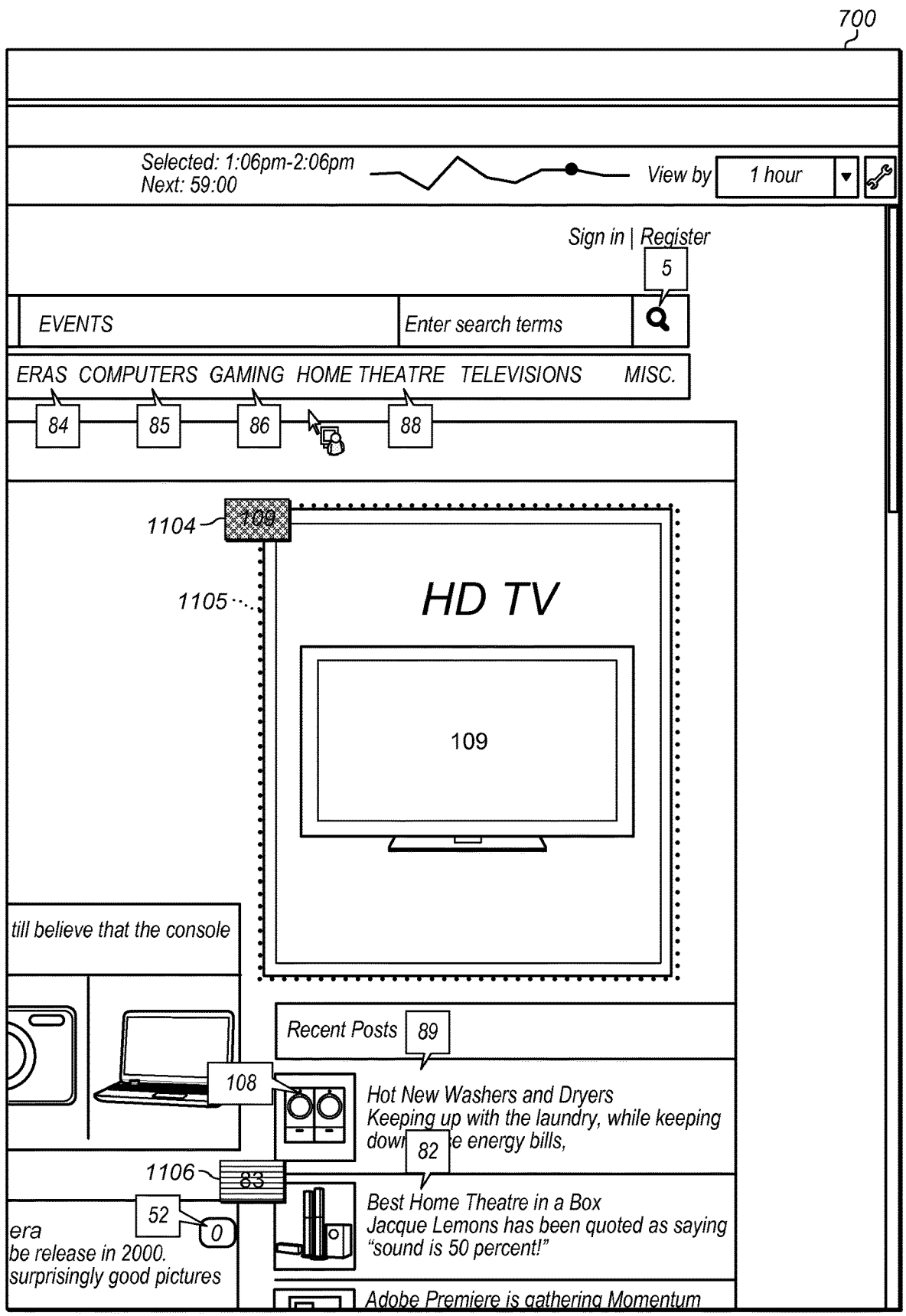

FIGS. 11A and 11B depict the trending tool user interface in trended mode and further where the user interface has been modified to reflect a user selection of the "Gainers and Losers" icon 1102. The "Gainers and Losers" icon allows a user to color code each of the overlay bubbles to reflect trending information.

In some embodiments, any visually distinctive modification to the overlay bubble may be performed to indicate gainers and losers. For example, in this case, overlay bubble 1104 corresponds to a crosshatch pattern over a gray background, and this pattern may indicate a positive, gaining trend of the link corresponding to the overlay bubble, in this case, image 1105. Similarly, overlay bubble 1106 corresponds to a horizontal line pattern over a white background, and this pattern may indicate a loser, or a negative trend of overlay information over the given window of time.

In other embodiments, there may be a spectrum of multiple patterns or colors, where each element along the spectrum may indicate a magnitude of trend change. For example, a spectrum of overlay bubble colors may be red, indicating a large negative trend, pink, indicating a small negative trend, gray, indicating neither gaining nor losing, yellow, indicating a slight gaining trend, and green, indicating a large positive trend. In other cases, more colors and any size spectrum may be defined to correspond to a set of ranges for analytics data values corresponding to the overlay bubbles or overlay information.

In some embodiments, multiple visual elements of the overlay bubble may be modified to reflect multiple aspects of trending information. For example, the overlay bubble may be colored green to indicate a positive trend, and further, the overlay bubble may also be set to flashing to indicate a large magnitude for the positive trend.

Figure 12A:
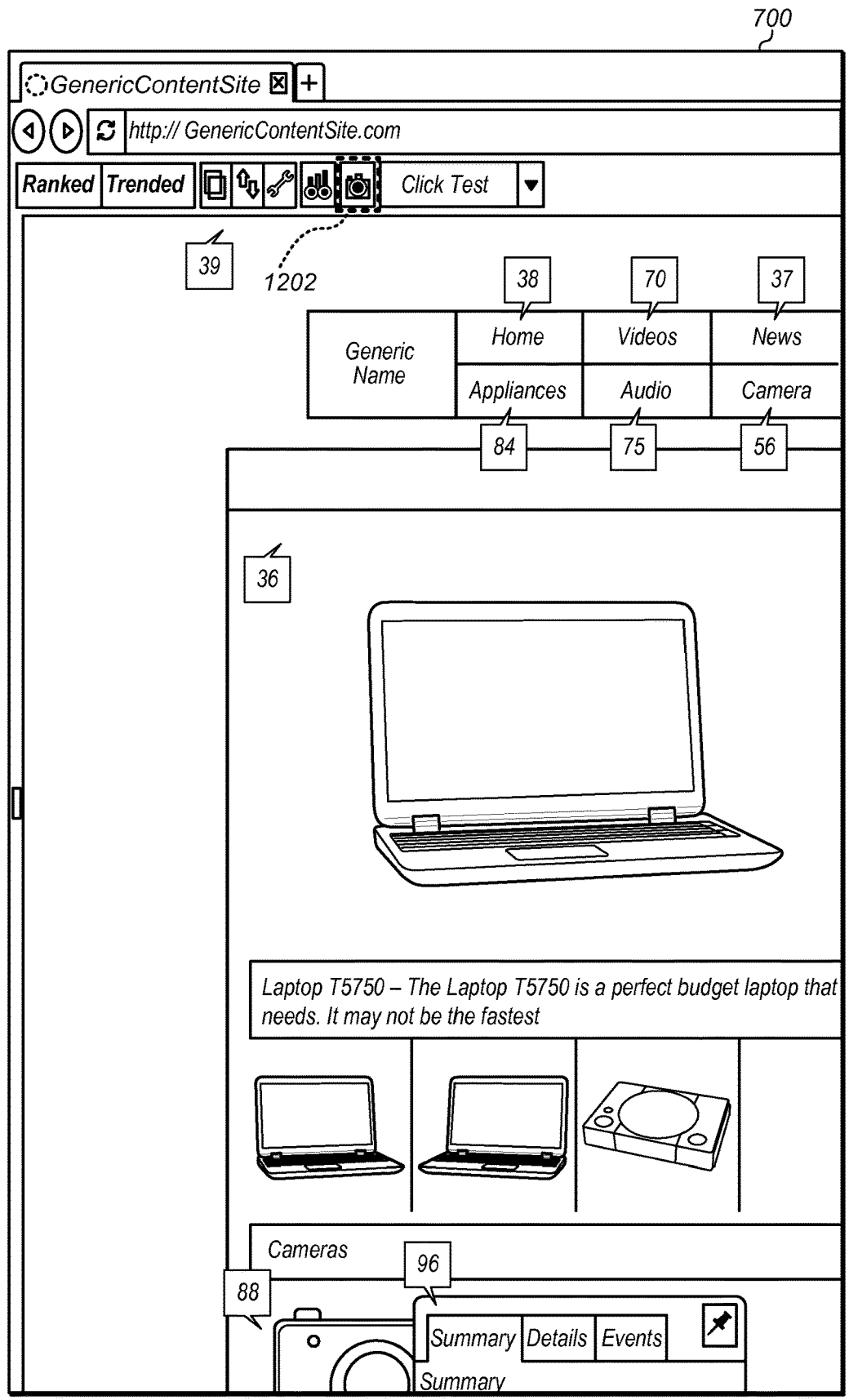
FIGS. 12A and 12B depict an illustration of user interface elements for saving a snapshot of the overlay information, according to some embodiments.
Figure 12B:
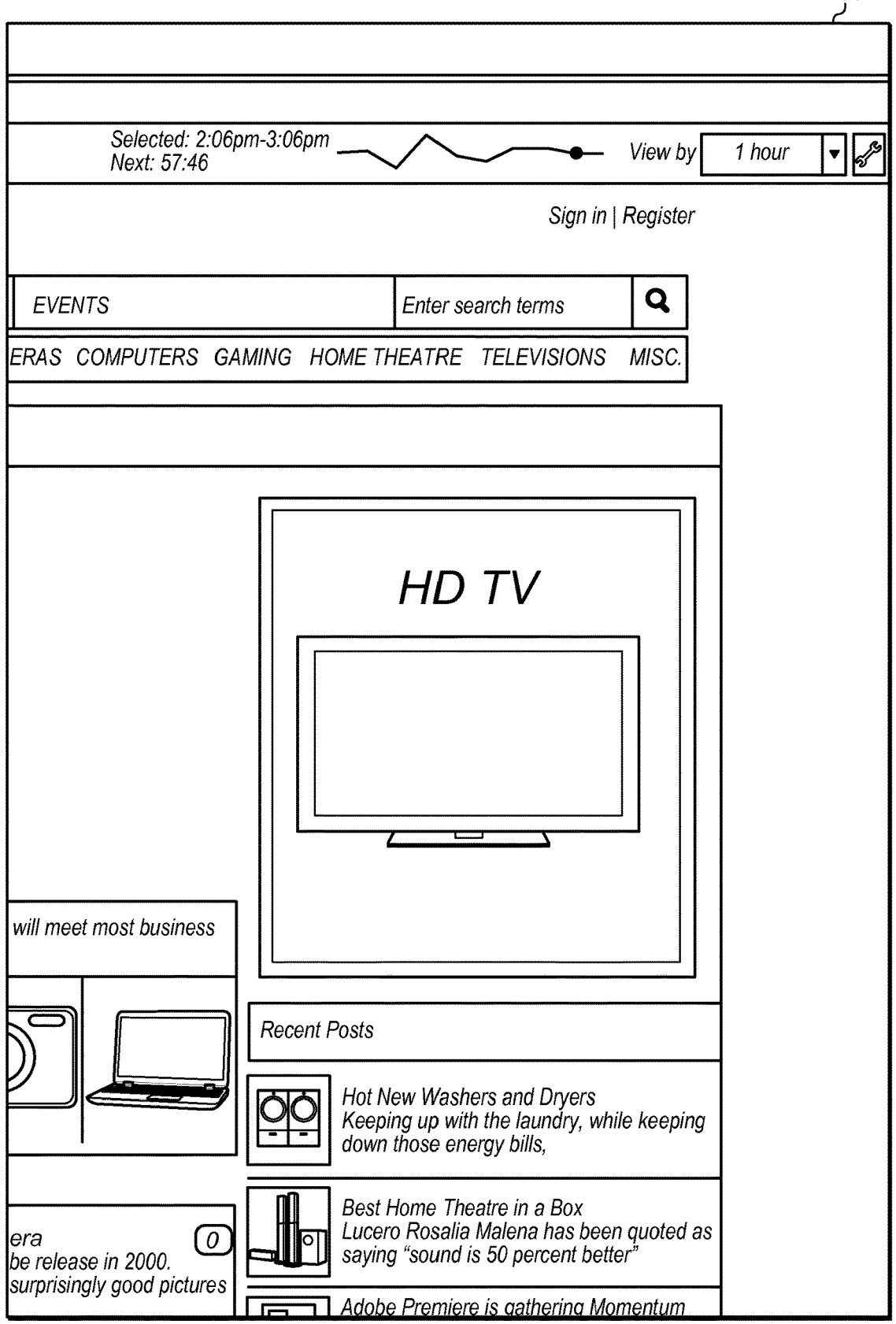

FIGS. 12A and 12B depict the trending tool user interface in trended mode and further where the user is about to select a snapshot icon 1202. The snapshot 1202 icon captures visualizations of overlay information generated through various options of the trending tool in the form an image. For example, given a display of the content page in user interface 700, and in response to a user selection of snapshot icon 1202, an image may be generated capturing the content page as overlaid with overlay bubbles and the corresponding overlay information.

In some embodiments, the content page snapshot may include the entire content page, even the portions not displayed in the trending tool user interface. In other cases, a user may choose to generate a snapshot for an entire site or for a selected subset of content pages of the site. The snapshot image may contain the overlay information as displayed in the trending tool user interface. However, the trending tool may create the snapshot image to further include the overall trending report as depicted in FIGS. 10A and 10B.

Further, in some embodiments, the snapshot image may capture a sequence of images corresponding to a selected window of time. For example, a user may select the snapshot icon 1202, and in response the user may be presented with an interface window where a period of time may be selected and where an time increment may be selected. In this case, a snapshot is created corresponding to the beginning of the time period, and a snapshot is created for each time increment from the beginning of the time period, and a snapshot image is created for the end of the time period.

In other embodiments, a user may, through the interface window presented upon selected snapshot icon 1202, select inflection points across a span of time. For example, a user may select time span of an arbitrary period of time, for example, 7:02 AM through 3:05 PM, on Mar. 1, 2012, such that a snapshot image is created for each inflection point. In other words, each time trending information changes from positive to negative or from negative to positive, at the point the change occurs, a snapshot image of the content page and the corresponding overlay information is created and stored. In this way, based simply on the number of snapshots created, a user may have a sense of how many trending changes occurred and have an image of the corresponding overlay information.

Figure 13A:
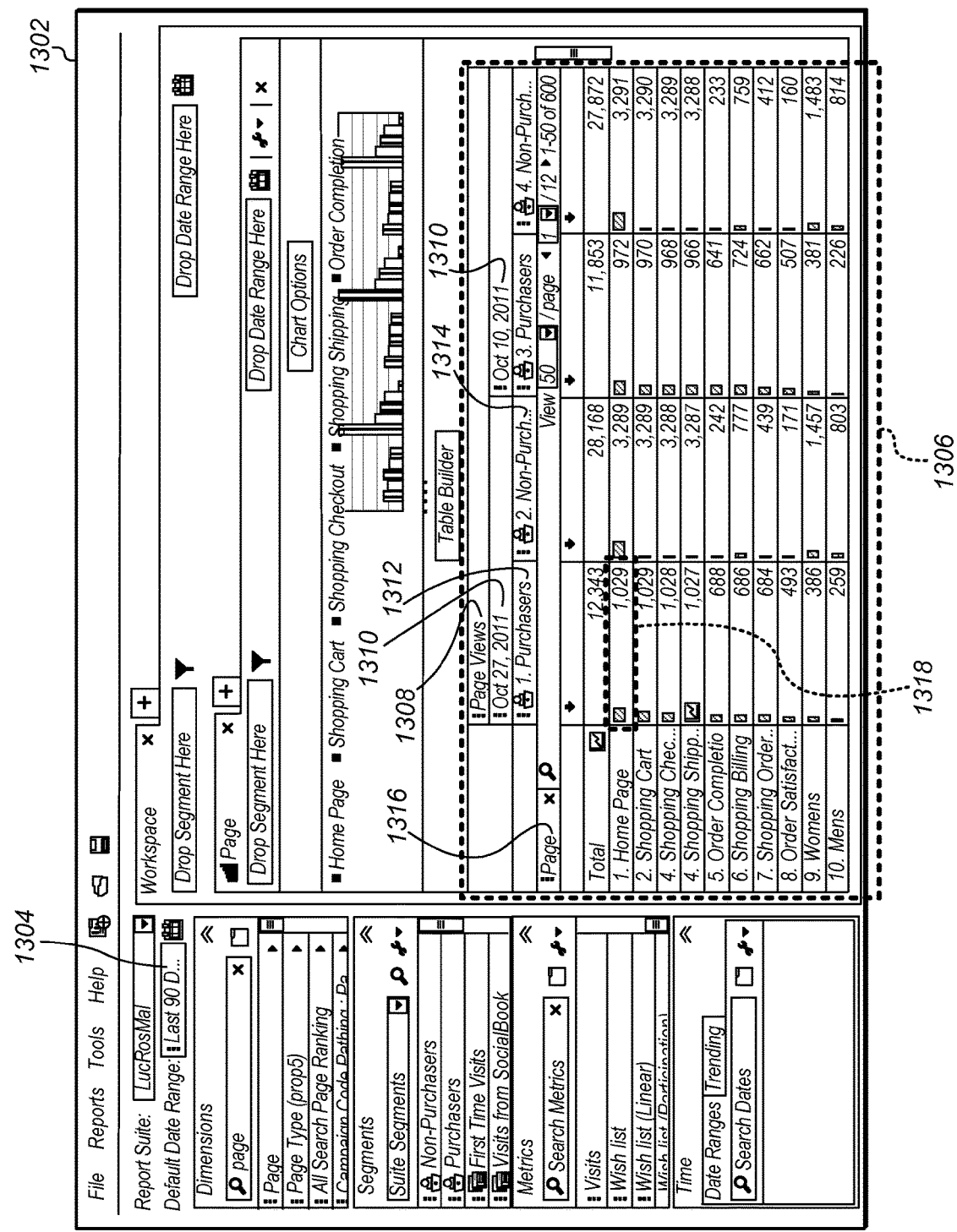
FIGS. 13A and 13B illustrate an analytics reporting application implementing a trending tool, according to some embodiments.

FIG. 13 illustrates a user interface 1302 for a report generation tool modified to support the functionality of the embodiments of a trending tool. In this example, the report generation tool is referred to as a trending tool.

As discussed above, a report generation tool is often used by data analytics to understand different aspects of analytics data. As depicted in FIG. 13, a report has been generated for a particular content site, where the date range over which analytics data is used is specified to be the last 90 days, as reflected within default date range 1304.

A report may generally include dimension items, segments, and metrics. For example, report 1306 includes a page views 1308 metric, date 1310 segments, purchasers 1312 segment, non-purchasers 1314 segment, and page 1316 dimension item. As depicted within report 1306, the metric data within a given cell of the report is an aggregated value over the given date range, in this example, the last 90 days. While a user may separately generate a report to display trending information, the trending tool allows a user to see trending information within the context of report 1306.

Figure 13B:
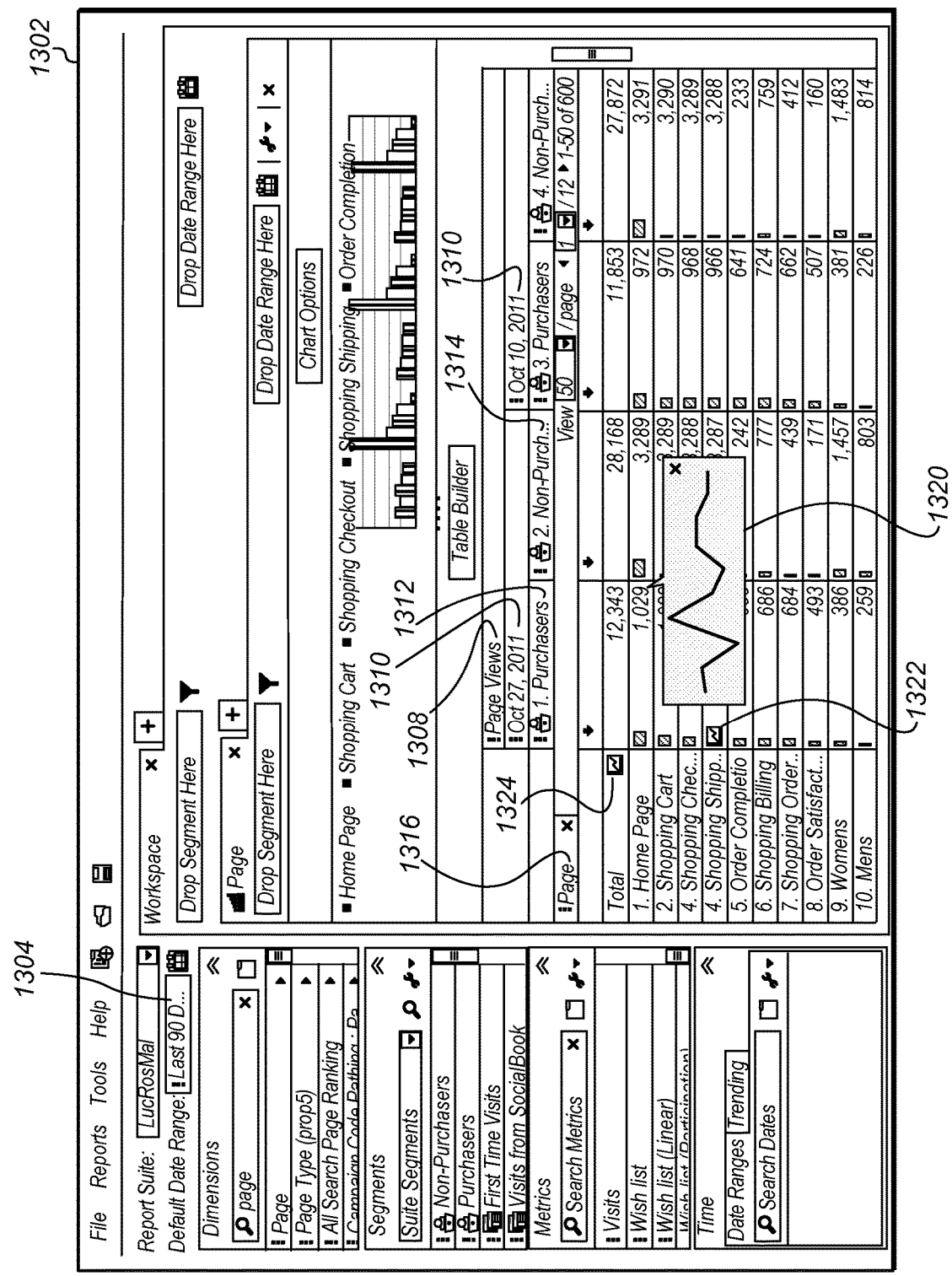

For example, upon hovering over cell 1318, the trending tool may display overlay 1320, as depicted in FIG. 13B, that includes trending information for the metric value as filtered according to the row and column segments and dimension items. In this way, a user may see that for a given metric value in a given cell, how the metric value is trending. For example, while cell 1318 may indicate the aggregate metric value over the last 90 days, if half of the metric values, in this case page views, were recorded in the past 10 days, then the trend information may provide a user with a better understanding of how the data is behaving.

In some cases, to see the trending information within an overlay, a user may click or select trending icon 1322. In other cases, a user may click or select icon 1324 to sort the pages under page 1316 according to trending information instead of according to aggregate totals. For example, the pages may be sorted according to which pages are most quickly trending up in terms of page views.

In short, trending information may be useful to generated analytics reports to make retrieval or viewing of trending information more efficient.

Trending Tool Module

Figure 14:
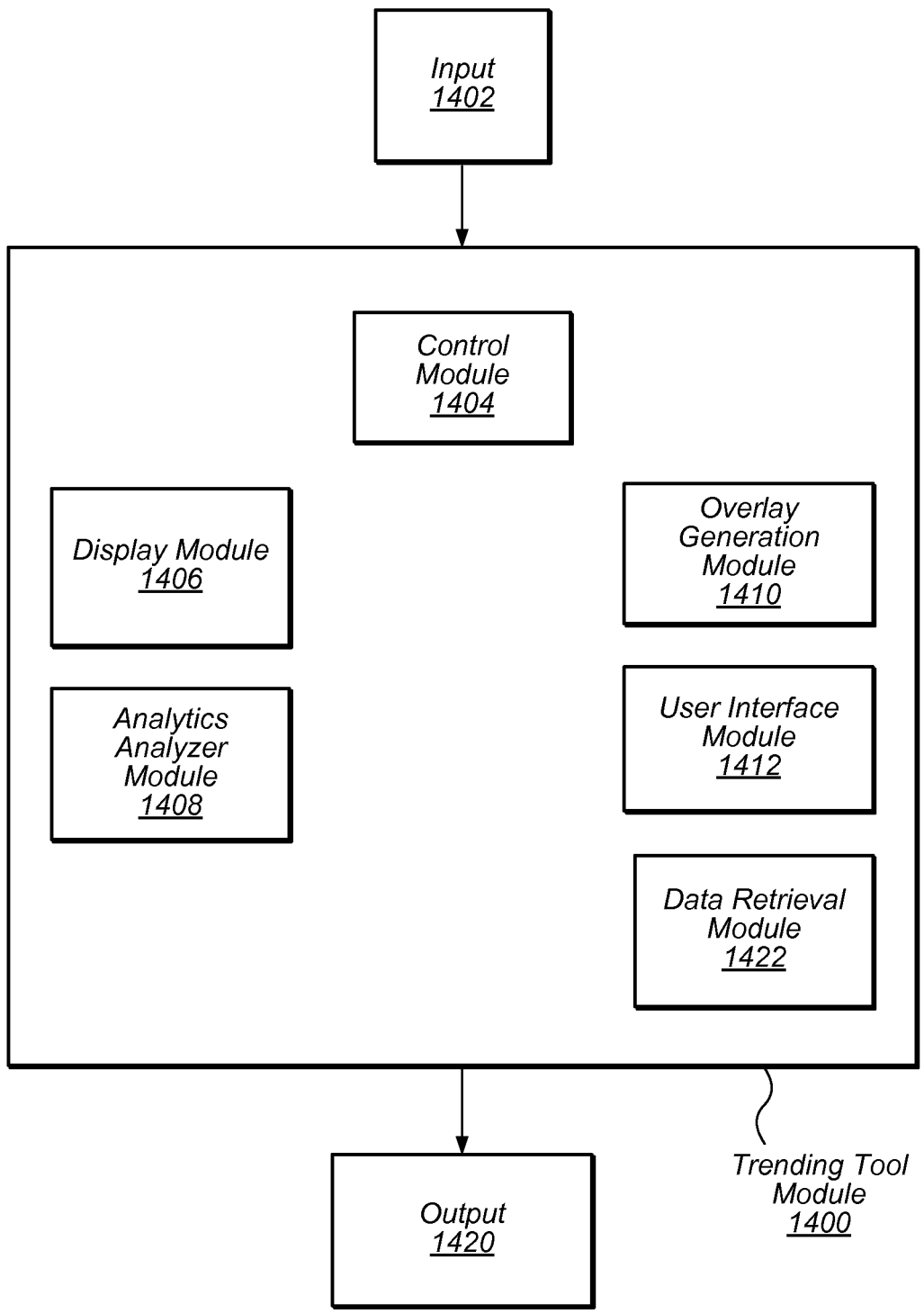
FIG. 14 illustrates a module that may implement a Trending Tool Module, according to some embodiments.

FIG. 14 illustrates an embodiment of a Trending Tool Module 1400. The Trending Tool Module 1400 may incorporate a content browser, a report generation tool, or another application for presenting content. The Trending Tool Module 1400 may take input 1402 in the form of a specification of a content page, a content site, or a period or periods of time along with a segment of analytics data for an element of a content page.

Upon receiving, through User Interface Module 1412, input 1402 indicating an element of a content page, or content pages for a content site, Control Module 1404 may retrieve, via Data Retrieval Module 1422, corresponding analytics data, either locally or from a remote analytics server, where the query to retrieve the relevant data is based on an item within the content page for which trending information is to be gathered, a segment of data, and the period or periods of time across which the trending information is calculated.

Given a selection of at least one content page through User Interface Module 1412, Display Module 1406 may generate display information and provide the display information as output 1420.

In response to receiving input indicating the display of overlay information, Overlay Generation Module 1410 may generate a respective visual presentation of an overlay for each of the items or links within a content page. In some cases, only a subset of the links are selected for the display of overlay information, for example, overlay information may only be displayed for the top 10 clicked links. In other cases, other criteria or other default settings may be used as the basis for selecting a subset of the displayed items or links, such as conversions, registrations for email updates, registrations for coupons, or any other aspect of the analytics data tracked for the content page.

Given the generation of visual presentations for each overlay to be displayed, Display Module 1406 may cause the display of each visual presentation such that the visual presentation of the overlay is displayed proximate to a respective link. In some cases, an overlay may appear as a semi-transparent box surrounding a link, where the semi-transparent box may be colored and may include a value in one of the corners providing an immediate indication of analytics data. The value may be generated according to the Analytics Analyzer Module 1408. For example, the number displayed in the corner of the overlay may be a ranking of the link with respect to other links in the web site, or with respect to set of links for which overlays are generated. In other embodiments, there may be more than one value displayed in the overlay, and the value may be some other measure or measures of the analytics data.

Further, a user may select a date range upon which trending information may be based, and where the trending information may be included in the display of an overlay. For example, a user may select a date range of the previous week, and in response, Analytics Analyzer Module 1408 may determine trending information based on the analytics data over the previous week. The trending information may be determined for each for each of the links with a corresponding overlay displayed.

The Overlay Generation Module 1410 may use the respective trending information for each of the displayed overlays to modify the visual presentation of for the respective overlay information. For example, if for a given item or link, the trending information indicates that the link corresponds to a strong positive trend, the visual presentation of the link overlay may be modified to be colored green. In this example, if for the given link, the trending information indicates that the link corresponds to a strong negative trend, the visual presentation of the link overlay may be modified to be colored red.

Example Computer System

Figure 6:
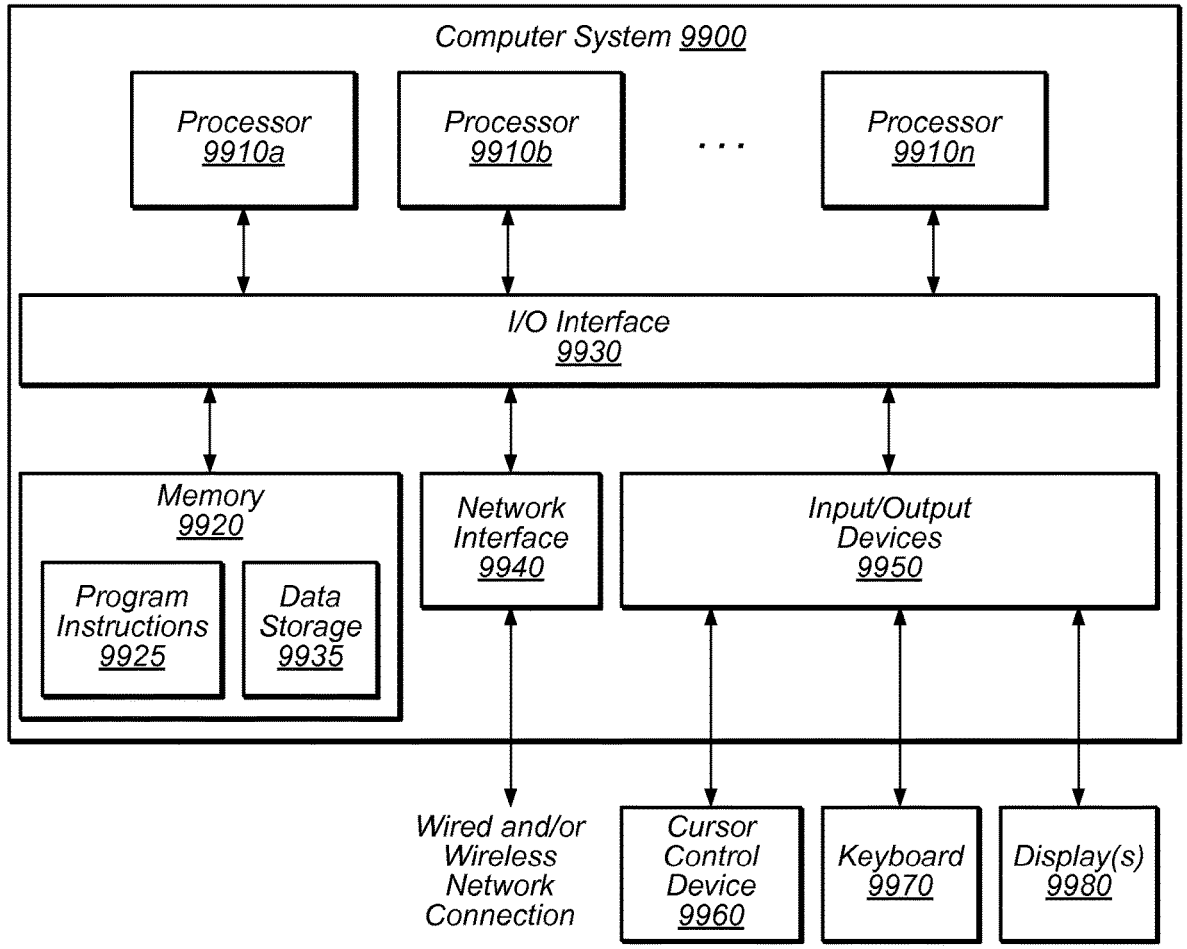
FIG. 6 depicts elements of an example computer system capable of implementing a trending tool.

FIG. 6 illustrates a computer system 9900 that may execute embodiments of the keyword refinement tool. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, the computer system includes one or more processors 9910a-9910n coupled to system memory 9920 via input/output (I/O) interface 9930. The computer system further includes network interface 9940 coupled to I/O interface 9930, and one or more input/output devices 9950, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible by a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the keyword refinement tool are shown stored within system memory 9920 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted by transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for use by another component. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data by one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement embodiments of the keyword refinement tool as described herein. In one embodiment, the program instructions may include software elements of embodiments of the modules discussed earlier in one of the embodiments of the keyword refinement tool. The data storage within the computer system may include data that may be used in other embodiments. In these other embodiments, other or different software elements and data may be included.

Those skilled in the art will appreciate that the computer system is merely illustrative and is not intended to limit the scope of the keyword refinement tool as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. A non-transitory computer-readable storage medium may include storage media or memory media such as magnetic or optical media such as disks or DVD/CD-ROM, volatile or non-volatile media such as RAM, ROM, and flash drives. More generally, computer-readable storage media may also include transmission media or signals such as electrical, electromagnetic, or digital signals, conveyed via a communication medium such as network and/or a wireless link.

The various methods described herein represent example embodiments of methods. These methods may be implemented in software, hardware, or by a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method for presenting, within the context of a web page or other content page, trend analytics data for hyperlinks and any other selectable items displayed within the content page, comprising:
    displaying, within a user interface, a content page accessed by a plurality of users over a computer network, the content page displaying a plurality of selectable items
    receiving, from an analytics data server, measured analytics data for analyzing how the plurality of users engage over periods of time with the selectable items displayed the content page; and
    in response to receiving, within the user interface, user input selecting a configuration for presenting one or more types of trending information over one or more specified periods of time for a subset of the selectable items displayed on the content page:
        retrieving the one or more types of trending information for each of the selectable items in the subset, wherein the trending information is based on the measured analytics data and indicates how each of the plurality of users engages with each of the selectable items in the subset at two or more points in time over the one or more specified periods of time; and
        displaying, within the user interface and within the context of the content page, for each of the selectable items in the subset, a presentation of the corresponding trending information within an overlay proximate to and visually associated with the respective selectable item based on said selected configuration, the overlay comprising a visual characteristic indicating a positive or negative trend value of the respective trending information for the respective selectable item.

2. The method of claim 1, wherein the overlay for each of the plurality of selectable items, is displayed prior to the presentation of trending information therein.

3. The method of claim 1, further comprising:
    displaying a trending graph, the trending graph corresponding to the trending information for the subset of selectable items;
    receiving input indicating one or more of the points in time along the trending graph; and
    updating, for each of the selectable items in the subset, the corresponding trending information within the overlay proximate to and visually associated with the respective selectable item to correspond to the indicated points in time along the trending graph.

4. The method of claim 1, further comprising:
for each of the selectable items in the subset, modifying the visual characteristic of each respective overlay based on a positive or negative change to the trend value of the respective trending information for the respective selectable item.

5. The method of claim 1, wherein said retrieving comprises communicating with the analytics data server to query the analytics data server for a subset of analytics data corresponding to parameters describing the subset of selectable items and the one or more specified periods of time.

6. A system for presenting, within the context of a web page or other content page, trend analytics data for hyperlinks and any other selectable items displayed within the content page, comprising:
a computer comprising a processor and a memory; and
one or more application modules in the memory that, when executed by the processor, configure the processor to:
display, within a user interface, a content page accessed by a plurality of users over a computer network, the content page displaying a plurality of selectable items
receive, from an analytics data server, measured analytics data for analyzing how the plurality of users engage over periods of time with the selectable items displayed the content page; and
in response to receiving, within the user interface, user input selecting a configuration for presenting one or more types of trending information over one or more specified periods of time for a subset of the selectable items displayed on the content page:
retrieve the one or more types of trending information for each of the selectable items in the subset, wherein the trending information is based on the measured analytics data and indicates how each of the plurality of users engages with each of the selectable items in the subset at two or more points in time over the one or more specified periods of time; and
display, within the user interface and within the context of the content page, for each of the selectable items in the subset, a presentation of the corresponding trending information within an overlay proximate to and visually associated with the respective selectable item based on said selected configuration, the overlay comprising a visual characteristic indicating a positive or negative trend value of the respective trending information for the respective selectable item.

7. The system of claim 6, wherein the overlay for each of the plurality of selectable items is displayed prior to the presentation of the trending information therein.

8. The system of claim 6, wherein the one or more application modules further configure the processor to:
display a trending graph, the trending graph presenting a graph corresponding to the trending information for the subset of selectable items;
receive input indicating one or more of the points in time along the trending graph; and
update, for each of the selectable items in the subset, the corresponding trending information within the overlay proximate to and visually associated with the respective selectable item to correspond to the indicated points in time along the trending graph.

9. The system of claim 6, wherein the one or more application modules further configure the processor to:
for each of the selectable items in the subset, modify the visual characteristic of each respective overlay based on a positive or negative change to the trend value of respective trending information for the respective selectable item.

10. A non-transitory computer-readable storage medium storing program instructions for presenting, within the context of a web page or other content page, trend analytics data for hyperlinks and any other selectable items displayed within the content page that, when executed by a computing device, cause the computing device to perform:
displaying, within a user interface, a content page accessed by a plurality of users over a computer network, the content page displaying a plurality of selectable items
receiving, from an analytics data server, measured analytics data for analyzing how the plurality of users engage over periods of time with the selectable items displayed the content page; and
in response to receiving, within the user interface, user input selecting a configuration for presenting one or more types of trending information over one or more specified periods of time for a subset of the selectable items displayed on the content page:
retrieving the one or more types of trending information for each of the selectable items in the subset, wherein the trending information is based on the measured analytics data and indicates how each of the plurality of users engages with each of the selectable items in the subset at two or more points in time over the one or more specified periods of time; and
displaying, within the user interface and within the context of the content page, for each of the selectable items in the subset, a presentation of the corresponding trending information within an overlay proximate to and visually associated with the respective selectable item based on said selected configuration, the overlay comprising a visual characteristic indicating a positive or negative trend value of the respective trending information for the respective selectable item.

11. The non-transitory computer-readable storage medium of claim 10, wherein said displaying the corresponding trending information for each selectable item in the subset comprises displaying the presentation of trending information within a previously displayed overlay.

12. The non-transitory computer-readable storage medium of claim 10, wherein the non-transitory computer-readable storage medium further stores additional program instructions that when executed by the computing device cause the computing device to perform:
displaying a trending graph, the trending graph presenting a graph corresponding to the trending information for the subset of selectable items;
receiving input indicating one or more of the points in time along the trending graph; and
updating, for each of the selectable items in the subset, the corresponding trending information within the overlay proximate to and visually associated with the respective selectable item to correspond to the indicated points in time along the trending graph.

13. The non-transitory computer-readable storage medium of claim 10, wherein the non-transitory computer-readable storage medium further stores additional program instructions that when executed by the computing device cause the computing device to perform:

for each of the selectable items in the subset, modifying the visual characteristic of each respective overlay based on a positive or negative change to the trend value of respective trending information for the respective selectable item.

14. The method of claim 1, wherein each respective overlay proximate to and visually associated with each respective selectable item is displayed as an icon, such that the icon tapers toward the respective selectable item to indicate its association therewith.

15. The method of claim 14, further comprising, responsive to an interaction with the displayed icon, displaying an additional overlay presenting additional analytics information corresponding to the respective selectable item.

16. The method of claim 3, further comprising, responsive to an interaction with a particular selectable item in the subset, changing the trending graph to present a graph corresponding to the trending information for the particular selectable item.

* * * * *